US010197216B2

(12) United States Patent
Smith et al.

(10) Patent No.: US 10,197,216 B2
(45) Date of Patent: Feb. 5, 2019

(54) MODULAR KIT FOR CONSTRUCTION OF APPARATUS INCLUDING POSITIONING MECHANISMS

(71) Applicant: University of North Carolina at Charlotte, Charlotte, NC (US)

(72) Inventors: Stuart T. Smith, Charlotte, NC (US); Stephen C. Howard, Charlotte, NC (US)

(73) Assignee: UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 588 days.

(21) Appl. No.: 14/775,495

(22) PCT Filed: Mar. 3, 2014

(86) PCT No.: PCT/US2014/019895
§ 371 (c)(1),
(2) Date: Sep. 11, 2015

(87) PCT Pub. No.: WO2014/164011
PCT Pub. Date: Oct. 9, 2014

(65) Prior Publication Data
US 2016/0033075 A1 Feb. 4, 2016

Related U.S. Application Data

(60) Provisional application No. 61/776,096, filed on Mar. 11, 2013.

(51) Int. Cl.
*B23P 19/00* (2006.01)
*F16M 11/24* (2006.01)
(Continued)

(52) U.S. Cl.
CPC ............... *F16M 11/24* (2013.01); *B01L 9/00* (2013.01); *B01L 9/50* (2013.01); *F16M 11/043* (2013.01);
(Continued)

(58) Field of Classification Search
CPC ... B23P 6/00; B23P 11/00; B23P 17/00; B23P 19/00; B23P 19/04; B23P 21/00; B25B 1/00; B25B 19/00; B25B 11/00
See application file for complete search history.

(56) References Cited

U.S. PATENT DOCUMENTS 4,496,165 A * 1/1985 Schrekeis ............. B23B 31/202
269/283
5,056,766 A * 10/1991 Engibarov ................ B25B 1/08
269/101

(Continued)

FOREIGN PATENT DOCUMENTS

GB 2 360 841 A 10/2001

OTHER PUBLICATIONS

Notification Concerning Transmittal of International Preliminary Report on Patentability for corresponding PCT Application No. PCT/US2014/019895, dated Sep. 24, 2015, 10 pages.

(Continued)

*Primary Examiner* — Lee D Wilson
(74) *Attorney, Agent, or Firm* — J. Clinton Wimbish; Nexsen Pruet, PLLC

(57) ABSTRACT

In one aspect, kits for constructing an apparatus are described herein which, in some embodiments, can demonstrate desirable modularity, adjustability, and reconfigurability. A kit for constructing an apparatus described herein comprises a plurality of modular blocks and fastening sleeves, sleeve pins and coupling pins for connecting the modular blocks to one another. A modular block comprises (Continued)

a series of first apertures for receiving one or more of the fastening sleeves and series of second apertures for receiving the sleeve pins to secure the fastening sleeves in the first apertures, wherein the second apertures intersect the first apertures.

19 Claims, 27 Drawing Sheets

(51) Int. Cl.
    *B01L 9/00*         (2006.01)
    *G02B 7/00*         (2006.01)
    *F16M 11/04*       (2006.01)
    *F16M 11/06*       (2006.01)
    *F16M 11/18*       (2006.01)

(52) U.S. Cl.
    CPC ............. *F16M 11/06* (2013.01); *F16M 11/18* (2013.01); *G02B 7/00* (2013.01); *B01L 2200/028* (2013.01)

(56) References Cited

U.S. PATENT DOCUMENTS

| | | | | |
|---|---|---|---|---|
| 5,060,920 A | * | 10/1991 | Engibarov | B25B 1/241 269/282 |
| 5,825,558 A | * | 10/1998 | Farmiga | G02B 7/00 359/813 |
| 5,828,502 A | * | 10/1998 | Afshari | G01M 11/04 211/41.1 |
| 6,503,020 B1 | * | 1/2003 | Mascioletti | E04B 1/2604 403/231 |
| 6,681,464 B1 | * | 1/2004 | Dupuis | B23Q 3/103 269/282 |
| 7,753,350 B2 | * | 7/2010 | Barziza | B23Q 3/103 269/100 |
| 7,922,159 B2 | * | 4/2011 | Troxler | B23Q 3/103 269/155 |
| 8,033,537 B2 | * | 10/2011 | Wuethrich | F16B 5/02 269/289 R |
| 2004/0165285 A1 | | 8/2004 | Galpin | |
| 2016/0033075 A1 | * | 2/2016 | Smith | B01L 9/00 248/558 |

OTHER PUBLICATIONS

"The LINOS Microbench," Jun. 14, 2012, https://www.qioptiq-shop.com/out/pictures/wysiwigpro/12-13%20englisch/01%20Microbench.pdf, [retrieved on Sep. 11, 2015] 58 pages.

International Search Report and Written Opinion dated Jun. 6, 2014 for PCT/US2014/019895, 12 pages.

\* cited by examiner

US 10,197,216 B2

MODULAR KIT FOR CONSTRUCTION OF APPARATUS INCLUDING POSITIONING MECHANISMS

RELATED APPLICATION DATA

This application is a U.S. National Phase of PCT/US2014/019895, filed Mar. 3, 2014, which claims priority pursuant to 35 U.S.C. § 119(e) to U.S. Provisional Patent Application Ser. No. 61/776,096 filed Mar. 11, 2013, both of which are incorporated by reference in their entireties.

FIELD

The present invention relates to modular construction kits and, in particular, to modular construction kits for constructing a movable stage.

BACKGROUND

Many tools, modules, components, and laboratory equipment devices are generally usable in a wide variety of configurations and orientations. As a result, it is often desirable to customize support structures, holders, fasteners and similar assemblies for particular applications. However, in many applications, customized assemblies or structures require custom-made parts or components, which can be costly and/or time consuming to design and manufacture. Further, many custom arrangements are not suitable for certain other applications, configurations, or orientations. In addition, customized apparatus, assemblies, structures, holders and/or fasteners can require adjustable settings for optimal utility. Therefore, there exists a need for improved components for constructing such apparatus, apparatus constructed with improved designs, and improved methods for constructing apparatus.

SUMMARY

In one aspect, kits for constructing an apparatus are described herein which, in some embodiments, can demonstrate desirable modularity, adjustability, and reconfigurability. In some embodiments, a kit for constructing an apparatus described herein comprises a plurality of modular blocks. The kit further comprises fastening sleeves, sleeve pins and coupling pins for connecting the modular blocks to one another. Additionally, the modular blocks comprise a series of first apertures for receiving one or more of the fastening sleeves and series of second apertures for receiving the sleeve pins to secure the fastening sleeves in the first apertures, wherein the second apertures intersect the first apertures. In some cases, intersecting first apertures and second apertures are normal to one another. Further, in some embodiments, adjacent faces of a modular block each comprise a series of first apertures and a series of second apertures. Moreover, in some embodiments, first apertures alternate with second apertures along each adjacent face. Additionally, a kit described herein can further comprise flexible elements for connecting the modular blocks to one another, the flexible elements permitting movement of the modular blocks relative to one another. In some embodiments, the flexible elements can comprise one or more apertures for receiving the coupling pins and/or sleeve pins. A kit for constructing an apparatus described herein can also comprise or be used to construct a stage, the stage being translatable by deformation of the flexible elements.

In another aspect, apparatus are also described herein. In some embodiments, an apparatus comprises a frame including a plurality of modular blocks connected by fastening sleeves and coupling pins. The fastening sleeves are positioned in a series of first apertures in the modular blocks and secured in the first apertures by sleeve pins. The sleeve pins are positioned in a series of second apertures in the modular blocks, wherein the second apertures intersect the first apertures. The apparatus can further comprise a stage coupled to the frame by one or more flexible elements and a drive element coupled to one or more of the modular blocks. The drive element is operable to move the one or more modular blocks resulting in deformation of the one or more flexible elements to translate the stage. The stage can be linearly translatable and/or rotationally translatable.

Methods of constructing an apparatus are also described herein. In some embodiments, a method comprises constructing an apparatus comprising a stage, wherein constructing comprises providing a kit including a plurality of modular blocks, fastening sleeves, sleeve pins and coupling pins, wherein a modular block comprises a series of first apertures for receiving one or more fastening sleeves and a series of second apertures for receiving the sleeve pins, wherein the second apertures intersect the first apertures. The method further comprises inserting the fastening sleeves in the first apertures and inserting the sleeve pins in the second apertures to secure the fastening sleeves in the first apertures. In addition, the method further comprises connecting the modular blocks to one another to form a frame of the apparatus by engaging the fastening sleeves with the coupling pins, and connecting the stage to the frame through one or more flexible elements. In some cases, the method can further comprise connecting at least one drive element to the frame, wherein the drive element is operable to move one or more of the modular blocks resulting in deformation of the flexible elements to translate the stage.

These and other embodiments are described further in the detailed description which follows.

DETAILED DESCRIPTION

Figure 1:
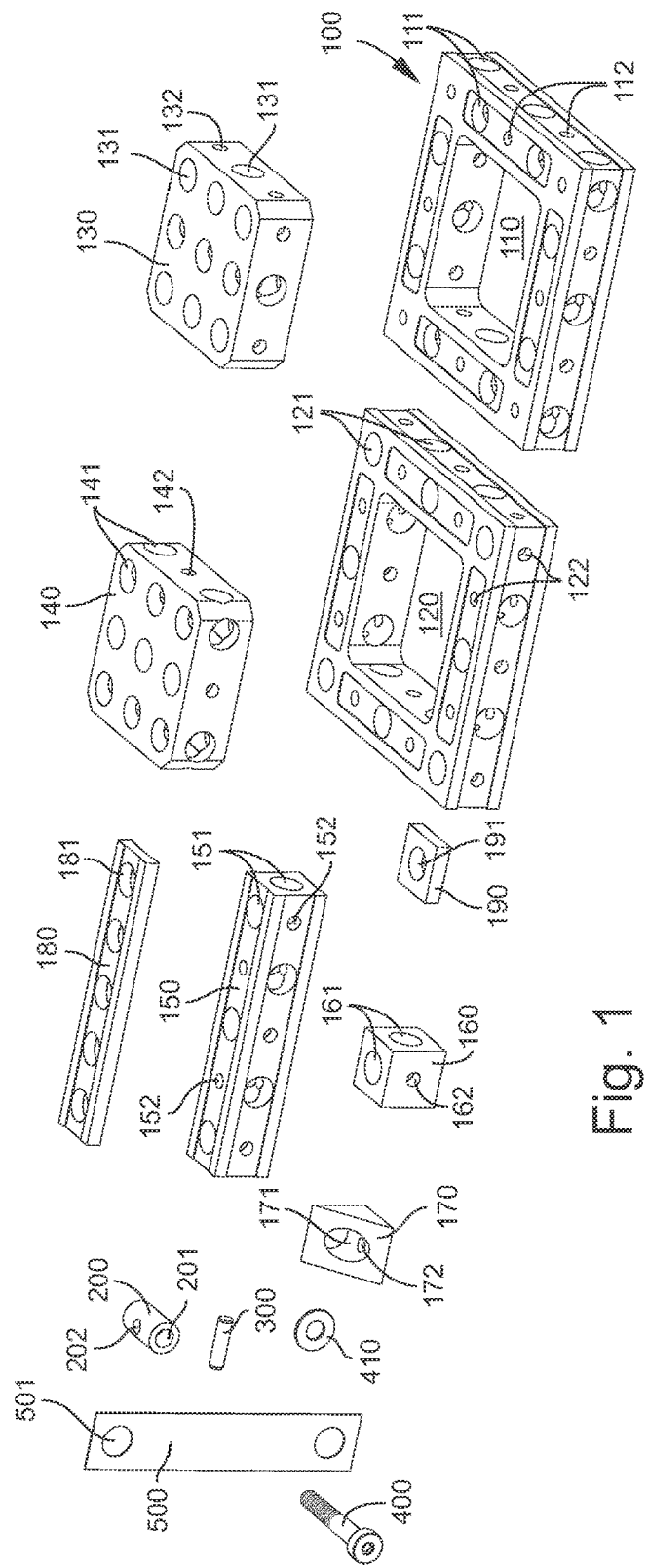
FIG. 1 illustrates a perspective view of components of a kit according to one embodiment described herein.

Embodiments described herein can be understood more readily by reference to the following detailed description, examples and drawings. Elements, apparatus and methods described herein, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

I. Kits for Constructing an Apparatus

In one aspect, kits for constructing an apparatus are described herein which, in some embodiments, demonstrate desirable modularity, adjustability, and reconfigurability. In some embodiments, a kit for constructing an apparatus described herein comprises a plurality of modular blocks and fastening sleeves, sleeve pins and coupling pins for connecting the modular blocks to one another, the modular block comprising a series of first apertures for receiving one or more of the fastening sleeves and a series of second apertures for receiving the sleeve pins to secure the fastening sleeves in the first apertures, wherein the second apertures intersect the first apertures. Additionally, the kit for constructing an apparatus can comprise flexible elements for connecting the modular blocks to one another, the flexible elements permitting movement of the modular blocks relative to one another.

Turning now to specific components, a kit for constructing an apparatus described herein comprises a plurality of modular blocks. A modular block can comprise or be formed from any material not inconsistent with the objectives of the present invention. In some embodiments, modular blocks are formed of metal. For example, in some cases, modular blocks described herein can be formed from aluminum, steel, titanium, nickel, chromium, cobalt, or alloys or mixtures thereof. In some embodiments, modular blocks are formed from a polymeric or plastic material, such as a polyethylene, polypropylene, polyurethane, polyester or epoxy resin. Other hard plastic materials may also be used.

Modular blocks, in some embodiments, comprise a series of first apertures and a series of second apertures. The first apertures are configured such that they receive one or more fastening sleeves. The second apertures are configured such that they receive sleeve pins for securing fastening sleeves in the first apertures. Additionally, second apertures can intersect first apertures. In some embodiments, adjacent faces of modular blocks each comprise a series of first apertures and a series of second apertures. Further, in some embodiments, the first apertures alternate with the second apertures along each adjacent face. In certain cases, intersecting first apertures and second apertures are normal or perpendicular to one another.

Kits described herein also comprise fastening sleeves, sleeve pins and coupling pins for connecting the modular blocks to one another. Fastening sleeves can be inserted into one or more of the first apertures in a modular block. Fastening sleeves can be formed in any shape or configuration not inconsistent with the objectives of the present invention. For example, in some embodiments, a fastening sleeve can be cylindrical, conical, frustoconical, pill-shaped, rectangular prism-shaped, or cubical. In other instances, a fastening sleeve can have a complex three-dimensional shape comprising a combination of two or more of the foregoing shapes. Moreover, in some embodiments, the fastening sleeves can comprise a sidewall aperture for receiving the sleeve pins. In some embodiments, the sidewall apertures of the fastening sleeves can intersect with the first apertures containing the fastening sleeves.

Sleeve pins can be formed in any shape or configuration not inconsistent with the objectives of the present invention. For example, in some embodiments, a sleeve pin can be cylindrical, conical, frustoconical, pill-shaped, rectangular prism-shaped, or cubical. In other instances, a fastening sleeve can have a complex three-dimensional shape comprising a combination of two or more of the foregoing shapes. Sleeve pins can be inserted into the second apertures of the modular blocks, and into the sidewall aperture of the fastening sleeves. In such a configuration, movement of the fastening sleeves relative to the modular blocks is arrested by the sleeve pin, thereby fixing the fastening sleeves in place for a secure fit within the modular blocks.

Coupling pins can be formed in any shape or configuration not inconsistent with the purposes of the present invention. For example, in some embodiments, a coupling pin can be cylindrical, conical, frustoconical, hexagonal prism-shaped, or pill-shaped. In some cases, coupling pins can comprise straight pins or threaded pin configurations. For example, in some embodiments, a coupling pin can comprise a pin, bolt, screw and/or rod. Further, in some embodiments, a coupling pin can comprise a plurality of sections, wherein one or more sections have a threading or similar locking configuration, and one or more other sections are cylindrical, conical, frustoconical, hexagonal, or pill-shaped. In some embodiments, coupling pin washers can be used with coupling pins in order to distribute the pressure of the coupling pin evenly over the modular block or to provide a smooth surface for an enlarged end of a coupling pin to rest in order to decrease the likelihood of loosening of the coupling pin as a result of an uneven fastening surface.

Further, in some embodiments, interiors of the fastening sleeves are of dimensions to engage the coupling pins. In some cases, the fastening sleeves of a kit described herein can have interiors dimensioned in such a manner that the coupling pins can engage the fastening sleeves. For example, in some embodiments, fastening sleeves can have interiors with circular, square, rectangular or elliptical cross sections which are sized and shaped in a manner corresponding to the cross section of the coupling pins. In some embodiments, the fastening sleeve interiors are threaded. In such embodiments, coupling pins can have threaded exteriors which correspond to the threaded fastening sleeve interiors to facilitate secure coupling with adjustable tightness.

Figure 2:
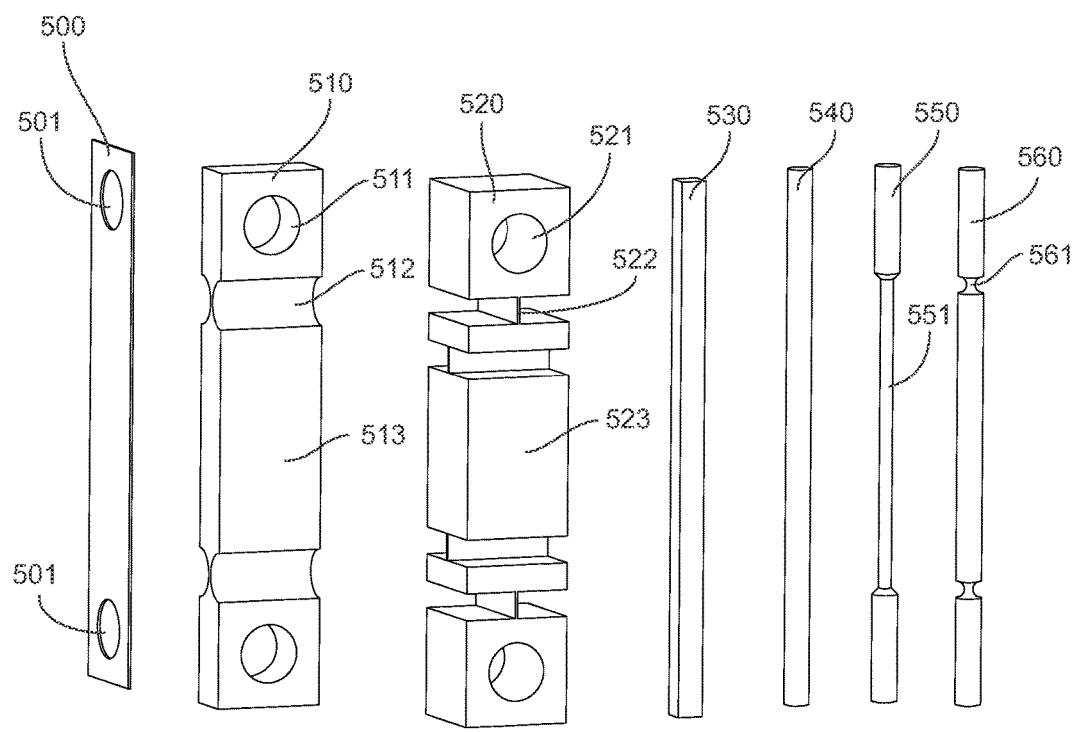
FIG. 2 illustrates flexible elements according to some embodiments described herein.

A kit described herein, in some embodiments, can also comprise flexible elements for connecting the modular blocks to one another. The flexible elements can have any shape not inconsistent with the objectives of the present invention. For example, in some embodiments, flexible elements are selected from the group comprising, consisting, or consisting essentially of metal sheets, metal rods, metal bars, or complex metal shapes. "Complex" metal shapes, for reference purposes herein, are polygonal shapes which are designed, shaped and/or configured to provide flexibility and/or translation in a particular direction. In certain embodiments, complex metal shapes can comprise rods or block-shaped components with notches, the notches having a smaller thickness than the body of the rod or block, and the notches being configured to permit flexibility in a particular direction. In some embodiments, complex metal shapes can comprise segmented rods or blocks, wherein one or more segments of the rod or block alternate with sheets or smaller rod shapes in order to permit flexibility in the sheet or smaller rod segment. In addition, in some cases, flexible elements can comprise one or more apertures for receiving coupling pins. Some non-limiting examples are depicted in FIG. 2.

Kits as described herein can be utilized to construct apparatus having certain components and/or properties. For example, in some embodiments, an apparatus constructed from the kit comprises a stage that can be translated by deformation of the flexible elements. In some embodiments, the apparatus can be deformed by one or more drive elements linked to one or more modular blocks in order to alter the shape or structure of the apparatus constructed from the kit. Any drive element not inconsistent with the objectives of the present invention can be used. For example, in some embodiments, a drive element can comprise, consist, or consist essentially of one or more micrometer drives, friction drives, electromagnets, magnetostrictive actuators, magnetoelastic actuators, piezoelectric actuators, hydraulic actuators, pneumatic actuators, electrostrictive actuators, electrostatic actuators, shape memory actuators, thermal actuators, and/or actuators using Poisson's ratio. The drive element can be linked to the one or more modular blocks by means of a drive coupling. In some embodiments, a drive coupling serves to translate drive element force in one or more specific directions while limiting or preventing transmission of drive forces in other directions. Any drive coupling structure not inconsistent with the objectives of the present invention can be used. In certain embodiments, drive couplings can comprise, consist, or consist essentially of wobble-pin, universal or u-joint, sphere-to-flat, mechanical insert, and/or rotationally symmetric notch drive coupling devices and/or structures. Therefore, in some embodiments, the stage of an apparatus constructed from a kit is at least one of linearly and rotationally translatable.

Some embodiments will now be further described with reference to the figures. FIG. 1 illustrates a perspective view of one embodiment of a kit for constructing an apparatus described herein. As understood by one of ordinary skill in the art, the various elements and/or components depicted in FIG. 1 are representational only and are not necessarily drawn to scale. In the embodiment of FIG. 1, a kit for constructing an apparatus comprises a plurality of modular blocks (100), fastening sleeves (200), sleeve pins (300), coupling pins (400), coupling washers (410), and one or more flexible elements (500). As illustrated in FIG. 1, certain elements and/or components of a kit for constructing an apparatus can be altered in order to meet the individual needs of the operator. For example, FIG. 1 illustrates that in some embodiments, modular blocks (110, 120) can have a square or rectangular shape with a recessed or hollow central portion, which allows other elements and/or components to be fastened or connected to or through the modular blocks (110, 120) in a variety of configurations. In some embodiments, some modular blocks (130, 140) can be configured to nest or fit into recesses or holes in other modular blocks (110, 120). In such embodiments, modular blocks (110, 120, 130, 140) can be configured such that first apertures (131, 141) and second apertures (132, 142) of the nesting modular blocks (130, 140) correspond to or are aligned with first apertures (111, 121) and second apertures (112, 122) of the modular blocks (110, 120) having recesses or holes.

In certain other embodiments, modular blocks (100) can have a variety of other shapes. For example, in some embodiments, modular blocks (150, 160, 170) can be rectangular-prism shaped, cubical, or wedge-shaped. In some embodiments, modular blocks (180, 190) can be configured as spacers. In such embodiments, modular blocks (180, 190) can comprise first apertures (181, 191) for receiving fastening sleeves (200) and/or coupling pins (400), but not necessarily second apertures. In some embodiments, modular blocks (180, 190) may be used with additional modular blocks (e.g., 150) having both first apertures (151) and second apertures (152).

FIG. 2 is an illustration of various embodiments of flexible elements (500) of a kit for constructing an apparatus. In some embodiments, a flexible element (500) can comprise a thin sheet or tab. Consistent with the foregoing disclosure, flexible elements (500, 510, 520) can further comprise one or more apertures (501, 511, 521) for receiving one or more fastening sleeves and/or coupling pins. In some embodiments, flexible elements (510, 520) can comprise complex metal shapes. For example, a flexible element (510) can comprise divots, notches and/or cutouts (512) of smaller thickness relative to other portions of the body (513). Where a flexible element (510) comprises divots, notches and/or cutouts (512), the divots, notches and/or cutouts (512) may be formed in a single direction, thereby permitting flexibility within the area of decreased thickness while restricting flexibility in the more rigid body (513). In other embodiments, flexible elements (520) can comprise a segmented body having thin segments (522) corresponding to divots and/or cutouts and thick segments (523) corresponding to the body. Thin segments (522) can permit flexibility of the flexible element (520) in one or more directions while restricting flexibility in one or more other directions. Flexible elements (500) can also comprise metal bars (530) or metal rods (540, 550, 560). Certain embodiments of flexible elements comprising bars or rods (550, 560) can comprise one or more areas of decreased thickness such as tapered portions (551) and/or divots (561). Such tapered portions (551) and/or divots (561) can function in a manner similar to the divots (512) or thin segments (522) described above.

Figure 3:
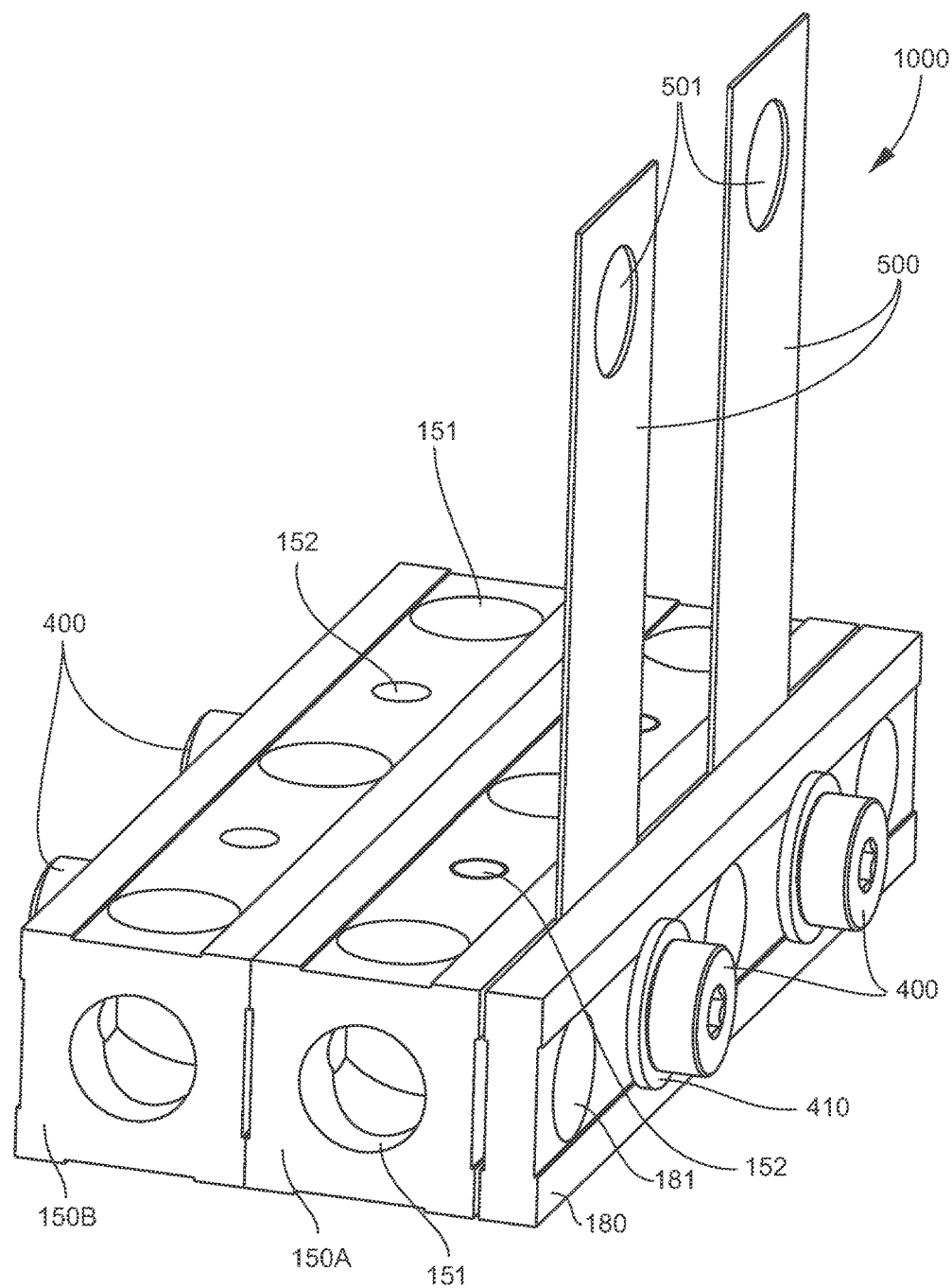
FIG. 3 illustrates a perspective view of an apparatus according to one embodiment described herein.
Figure 4:
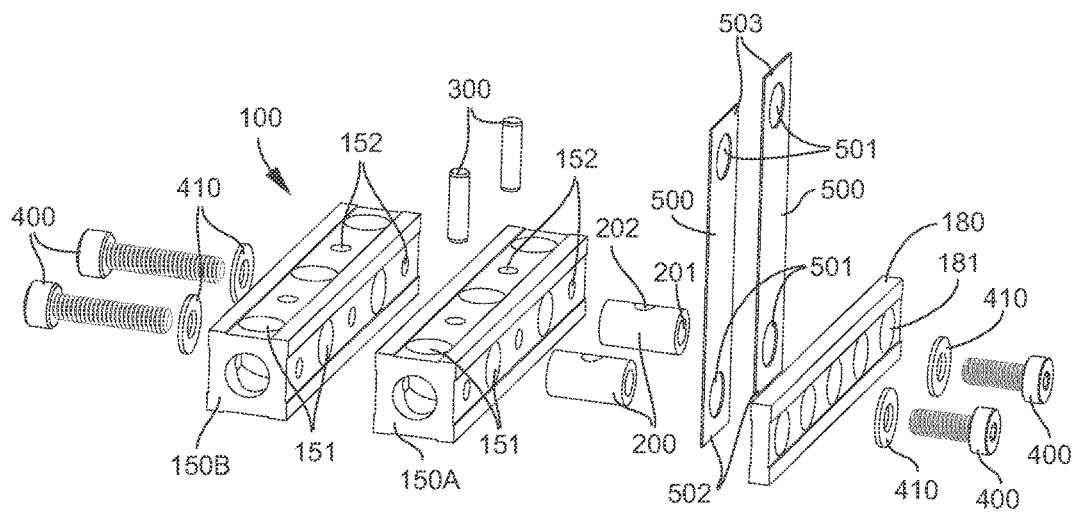
FIG. 4 illustrates an exploded view of the apparatus of FIG. 3.

FIG. 3 is a perspective view of an example apparatus (1000) which illustrates general interconnectivity of modular blocks (100), flexible elements (500), coupling pins (400), fastening sleeves (200) and sleeve pins (300) according to one embodiment of a kit for constructing an apparatus described herein. FIG. 4 is an exploded view of the apparatus (1000) of FIG. 3. The apparatus (1000) of FIG. 3 can be constructed using one embodiment of a kit described herein. In the apparatus of FIG. 3, a central modular block (150) receives two fastening sleeves (200) in two first apertures (151). The fastening sleeves (200) are oriented such that fastening sleeve interiors (201) are oriented horizontally in order to receive horizontally inserted coupling pins (400) through both first apertures (151) of the modular block (150). Further, the fastening sleeves (200) are oriented such that when the sleeve pins (300) are inserted into a second aperture (152) of the modular block (150) which is normal to the first aperture (151) of the modular block (150), the sleeve pins (300) also pass through corresponding sidewall apertures (202) in the fastening sleeves (200). This configuration arrests the motion of the fastening sleeves (200) within the modular block (150A), preventing lateral movement through the first apertures (151). In the embodiment of FIGS. 3 and 4, a second modular block (150) is disposed adjacent to the first modular block (150), with corresponding first apertures (151) and second apertures (152) being disposed adjacent to one another. This orientation permits the coupling pins (400) to pass through the second modular block (150) into the first modular block (150), where the coupling pins (400) may be received by the fastening sleeves (200). A coupling pin washer (410) can also be utilized in order to protect the modular block (150) from damage, and to prevent unwanted loosening of the coupling pins. On an opposite side of the first modular block (150) from the second modular block (150), two flexible elements (500) are disposed with the flexible element apertures (501) being aligned with first apertures (151) of the modular blocks (150). This configuration permits coupling pins (400) to pass through the flexible element apertures (501). A third modular block (180) comprising first apertures (181) is disposed adjacent to the flexible elements (500). Coupling pins (400) and coupling pin washers (410) are inserted through the first apertures (181) of the modular block, through the flexible element apertures (501), and into the fastening sleeves (200). When the coupling pins are fully inserted, as illustrated in FIGS. 3 and 4, the coupling pins are tightened by threading, the apparatus (1000) is securely constructed, with the flexible elements (500) secured at one end (502) but unsecured at the other end (503). In this manner, the flexible elements can be flexed and/or translated for operation of the apparatus (1000).

II. Apparatus

In another aspect, apparatus are also described herein. In some embodiments, an apparatus comprises a frame including a plurality of modular blocks connected by fastening sleeves and coupling pins, the fastening sleeves positioned in a series of first apertures in the modular blocks and secured in the first apertures by sleeve pins, and the sleeve pins are positioned in a series of second apertures in the modular blocks, wherein the second apertures intersect the first apertures. In some cases, an apparatus further comprises a stage coupled to the frame by one or more flexible elements and a drive element coupled to one or more of the modular blocks, the drive element operable to move the one or more modular blocks resulting in deformation of the one or more flexible elements to translate the stage. In some embodiments, the stage can be at least one of linearly translatable and/or rotationally translatable.

Turning now to specific components, an apparatus described herein comprises a frame including a plurality of modular blocks connected by fastening sleeves and coupling pins. The fastening sleeves of the apparatus can be positioned in a series of first apertures in the modular blocks and secured in the first apertures by sleeve pins. The sleeve pins can be positioned in a series of second apertures in the modular blocks. The modular blocks, fastening sleeves, sleeve pins, coupling pins, first apertures, and second apertures of an apparatus described herein can comprise any modular blocks, fastening sleeves, sleeve pins, coupling pins, coupling pin washers, and/or flexible elements as described hereinabove in Section I. Further, a frame of an apparatus described herein can be formed from the foregoing elements and/or components in any configuration and/or orientation not inconsistent with the objectives of the present invention. For example, in some embodiments, a frame of an apparatus described herein can provide a rigid structure for mounting, anchoring, connecting and/or constructing additional elements and/or components of an apparatus described herein and/or external components. Some non-limiting examples of external components which may be mounted, anchored, and/or connected to the frame include tools, modules, components, and laboratory equipment devices.

An apparatus described herein can also comprise a stage coupled to the frame by one or more flexible elements. A stage of an apparatus described herein can have any shape, orientation and/or configuration not inconsistent with the objectives of the present invention. For example, a stage of an apparatus described herein can be coupled to the frame in one or more of the following orientations: above the frame, below the frame, and/or parallel to the frame. Additionally, a stage, in some embodiments, can comprise or be formed from any combination of elements and/or components described in Section I. Further, flexible elements of an apparatus can comprise any flexible elements described hereinabove in Section I. For example, flexible elements can comprise, consist, or consist essentially of metal sheets, metal bars, metal rods, and/or complex shapes. A stage described herein can be structurally similar or identical to a corresponding frame, both elements comprising the same or substantially the same components. In such embodiments, a stage may be one or more of linearly and/or rotationally translatable relative to a corresponding frame, whereas a frame described herein generally remains stationary relative to a stage.

An apparatus described herein can further comprise a drive element coupled to one or more of the modular blocks, the drive element being operable to move the one or more modular blocks. A drive element can comprise any element, component, and/or structure not inconsistent with the objectives of this invention, including a drive element described hereinabove in Section I. For example, a drive element can comprise, consist, or consist essentially of one or more of micrometer drives, friction drives, electromagnets, magnetostrictive actuators, magnetoelastic actuators, piezoelectric actuators, hydraulic actuators, pneumatic actuators, electrostrictive actuators, electrostatic actuators, shape memory actuators, thermal actuators, and/or actuators using Poisson's ratio. The drive element can be linked to the one or more modular blocks by means of a drive coupling. In some embodiments, a drive coupling serves to translate drive element force in one or more specific directions while limiting or preventing transmission of drive forces in other directions. A drive coupling, in some embodiments, can comprise or be formed from any combination of elements and/or components described in Section I.

Figure 5:
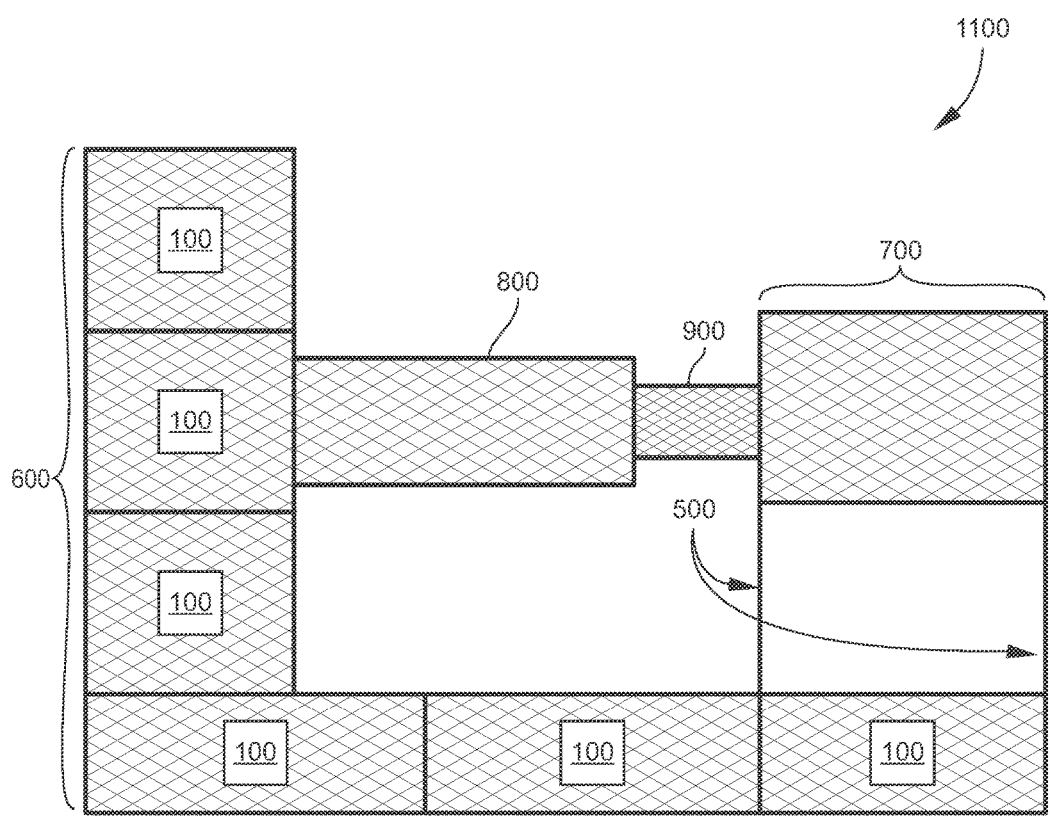
FIG. 5 illustrates a schematic diagram of an apparatus according to one embodiment described herein.

Some embodiments will now be further described with reference to the figures. FIG. 5 illustrates a schematic diagram of an example apparatus (1100) according to one embodiment described herein. The apparatus (1100) comprises a frame (600), the frame including a plurality of modular blocks (100) connected by fastening sleeves (not shown) and coupling pins (not shown). The apparatus (1100) further comprises a stage (700) and a drive element (800). The stage (700) coupled to the frame (600) by flexible elements (500). The drive element (800) is coupled to one or more of the modular blocks (100) by a coupling (900). In the apparatus (1100) of FIG. 5, the drive (800) can apply a directional force upon the stage (700) through the coupling (900), resulting in linear and/or rotational translation of the stage (700) while the frame (600) remains stationary.

Figure 6:
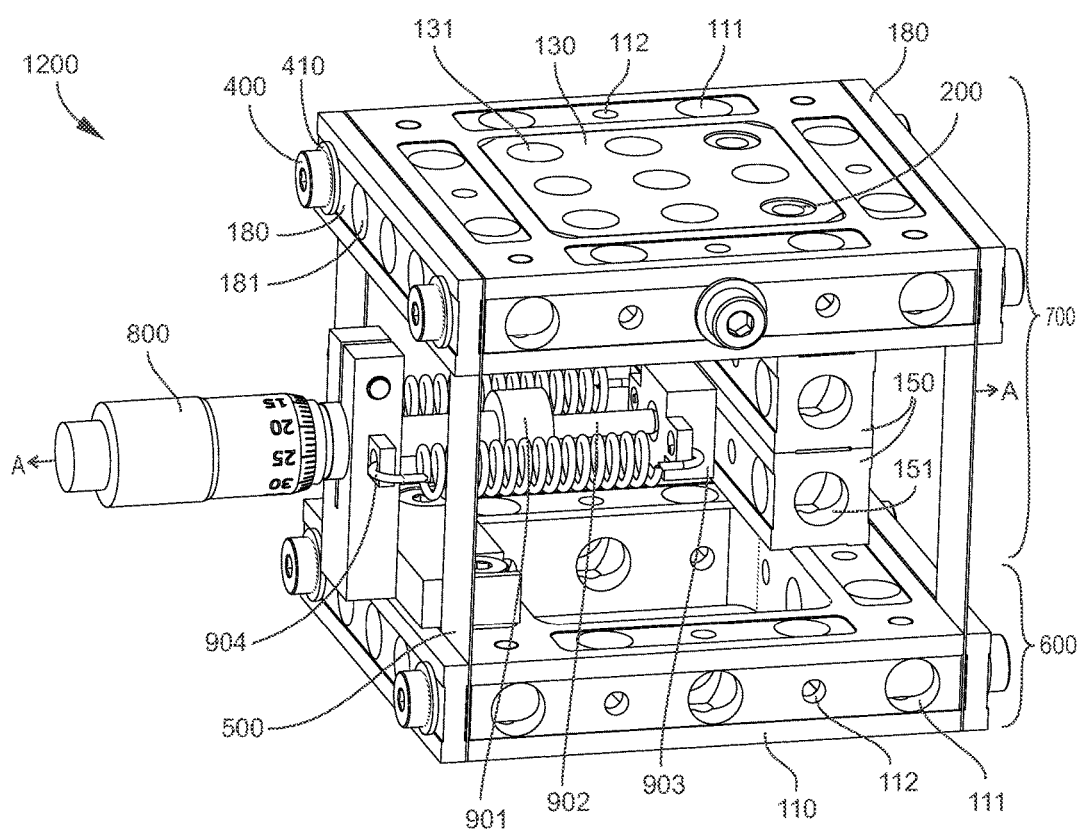
FIG. 6 illustrates a perspective view of an apparatus according to one embodiment described herein.
Figure 7:
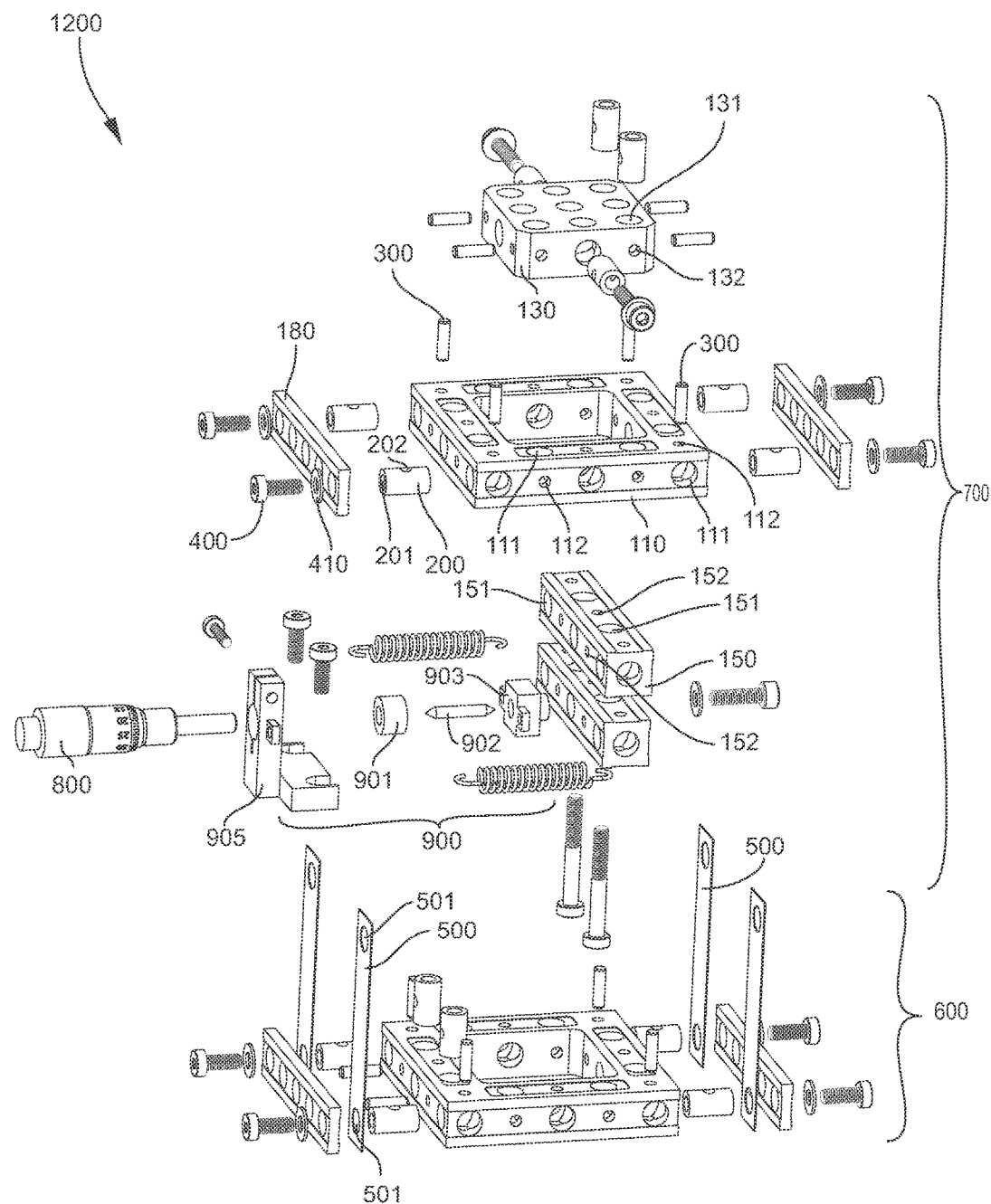
FIG. 7 illustrates an exploded view of the apparatus of FIG. 6.

FIG. 6 is a perspective view of an example apparatus according to another embodiment described herein. FIG. 7 is an exploded view of the apparatus of FIG. 6. FIGS. 6 and 7 illustrate an apparatus (1200) comprising a frame (600), a stage (700) coupled to the frame (600) by flexible elements (500) and a drive element (800) coupled to one or more of the modular blocks (150) via a drive coupling (900). The frame (600) comprises a plurality modular blocks (110, 180) connected by fastening sleeves (200) and coupling pins (400), the fastening sleeves (200) positioned in a series of first apertures (111, 181) in the modular blocks (110, 180) and secured in the first apertures (111, 181) by sleeve pins (300), the sleeve pins (300) positioned in a series of second apertures (112) in the modular blocks, wherein the second apertures (112) intersect the first apertures (111). In FIGS. 6 and 7, the stage (700) also comprises one or more modular blocks (110, 130, 150, 180), fastening sleeves (200), sleeve pins (300), and coupling pins (400). As illustrated in the perspective view of FIG. 6, the drive element (800) is coupled to the stage (700) by a wobble pin style drive coupling (900) which comprises several subcomponents, the subcomponents being a wobble pin (902) having semi-spherical or otherwise rounded ends mounted into drive cups (901, 903), with the drive element (800) being secured to the wobble pin (902) and cups (901, 903) by a coupling fixture (905). In the embodiment of FIGS. 6 and 7, the micrometer style drive element (800) applies directional force to the stage (700), the directional force being transferred and aligned by the coupling (900). Application of the directional force causes translation of the stage (700) as the flexible elements (500) flex or bend in the direction of the applied force, while the frame (600) remains stationary. This allows adjustment of the apparatus (1200) as necessary by an operator for the specific task being performed utilizing the apparatus (1200). In the apparatus of FIG. 6, the drive (800) applies force along axis A.

Figure 8:
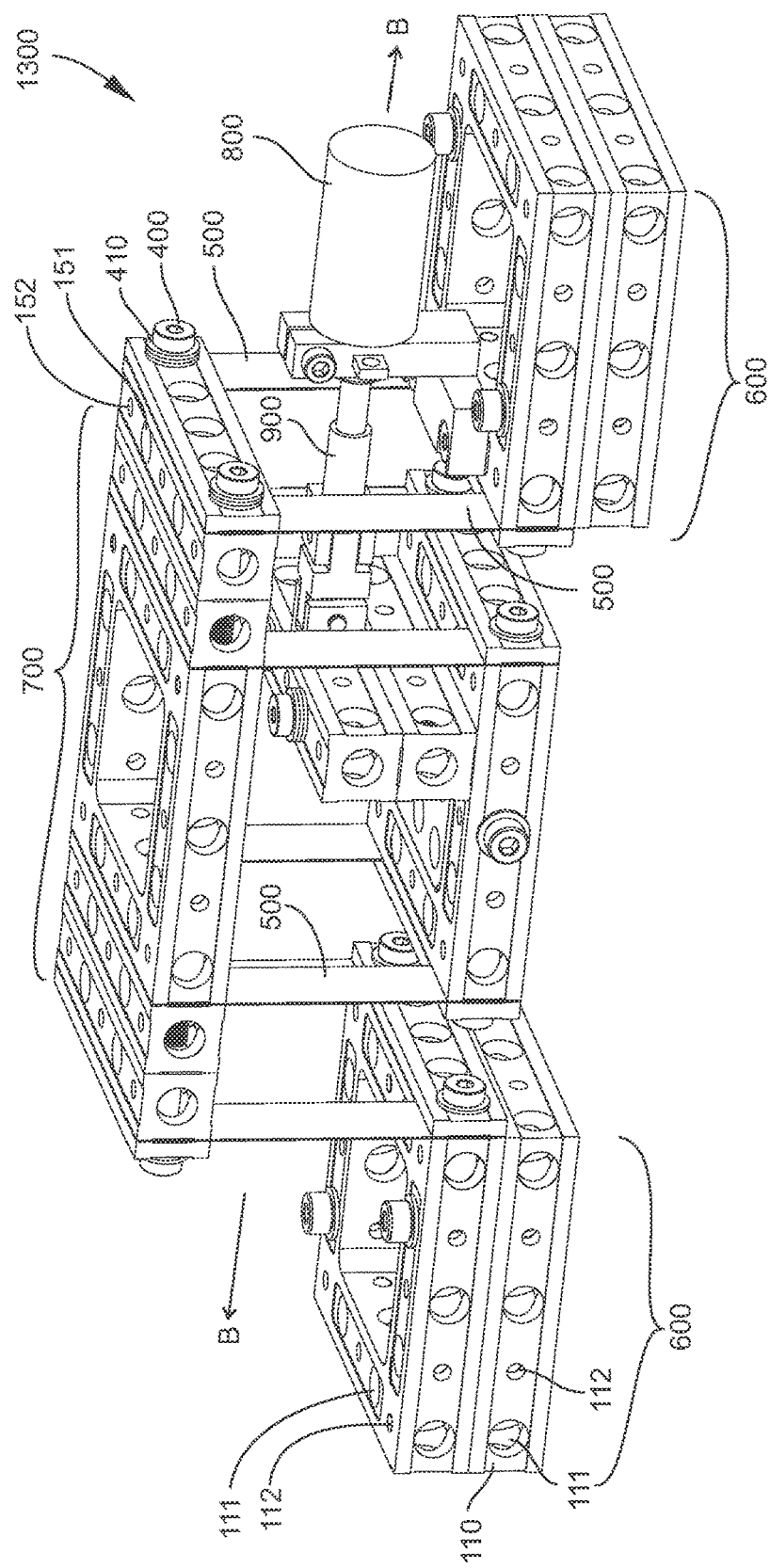
FIG. 8 illustrates a perspective view of an apparatus according to one embodiment described herein.

FIG. 8 is a perspective view of an example apparatus (1300) according to one embodiment described herein which utilizes an electromagnetic actuator drive element (800). The apparatus (1300) of FIG. 8 comprises a stage (700) coupled to a frame (600) by flexible elements (500). The drive element (800) of the embodiment of FIG. 8 comprises an electromagnetic actuator coupled via a universal joint style drive coupling (900) linked to modular blocks (150). Such a configuration permits one-axis linear translation initiated by the drive element (800) along axis B.

Figure 9:
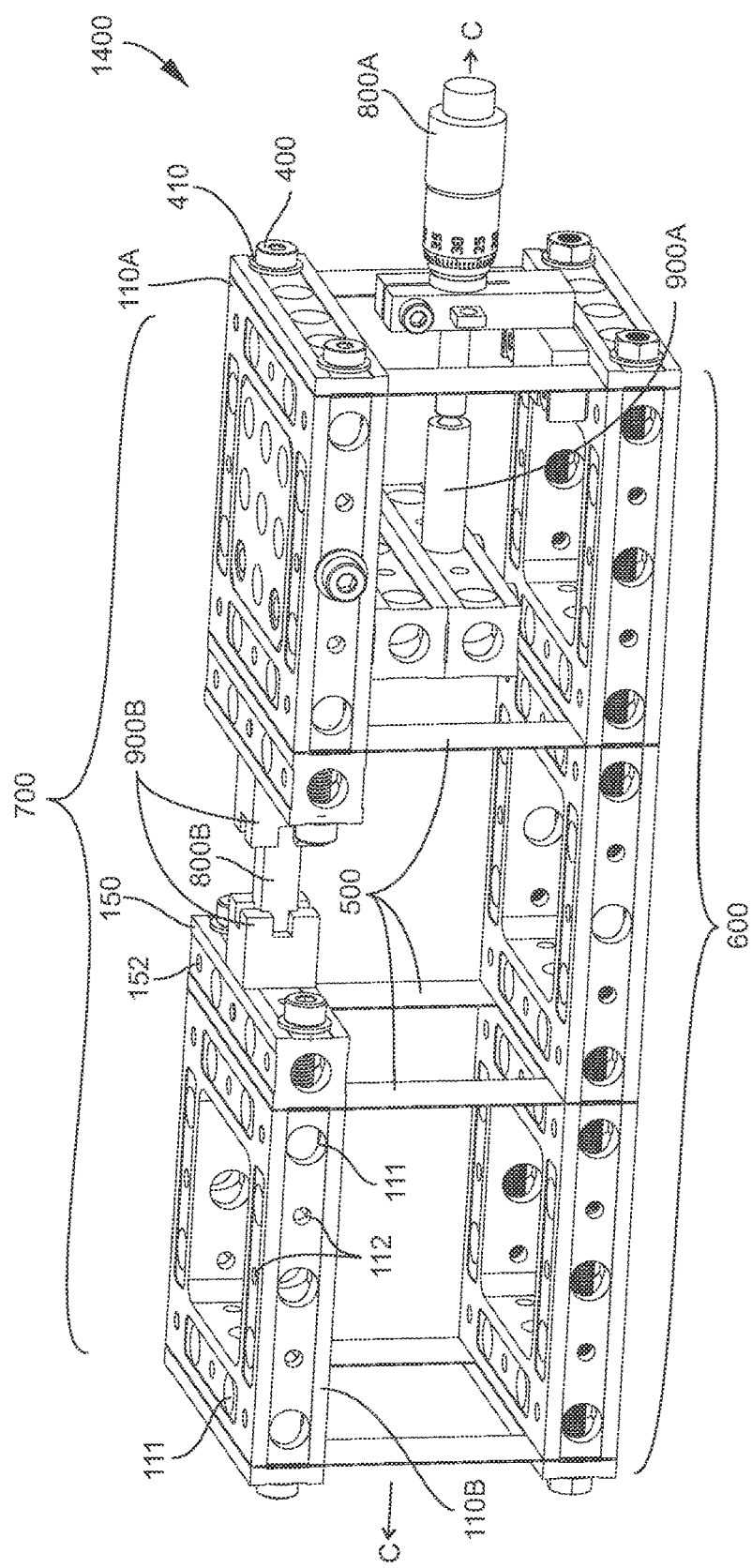
FIG. 9 illustrates a perspective view of an apparatus according to one embodiment described herein.

FIG. 9 is a perspective view of an example apparatus according to one embodiment described herein which utilizes stages (700) and a piezoelectric actuator (800B) and micrometer actuator drive element (800A). The apparatus (1400) of FIG. 9 comprises a stage (700) including two separate portions comprising modular blocks (110, 130, 150). As in the foregoing embodiments, a drive element (800A) is coupled to the one or more modular blocks (150) through a sphere-to-flat coupling (900A) in a manner operable to move the one or more modular blocks (110, 130, 150). Between the two stages comprising modular blocks (110A, 110B) is a secondary structure comprising a further actuator assembly which comprises a fine-motion piezoelectric actuator (800B) and actuator couplings (900B). In the apparatus (1400), the micrometer drive element (800A) translates one-axis coarse linear motion of the stage (700) and the piezoelectric drive element (800B) translates one-axis fine linear motion of the stage (700) along axis C while the frame (600) remains stationary.

Figure 10:
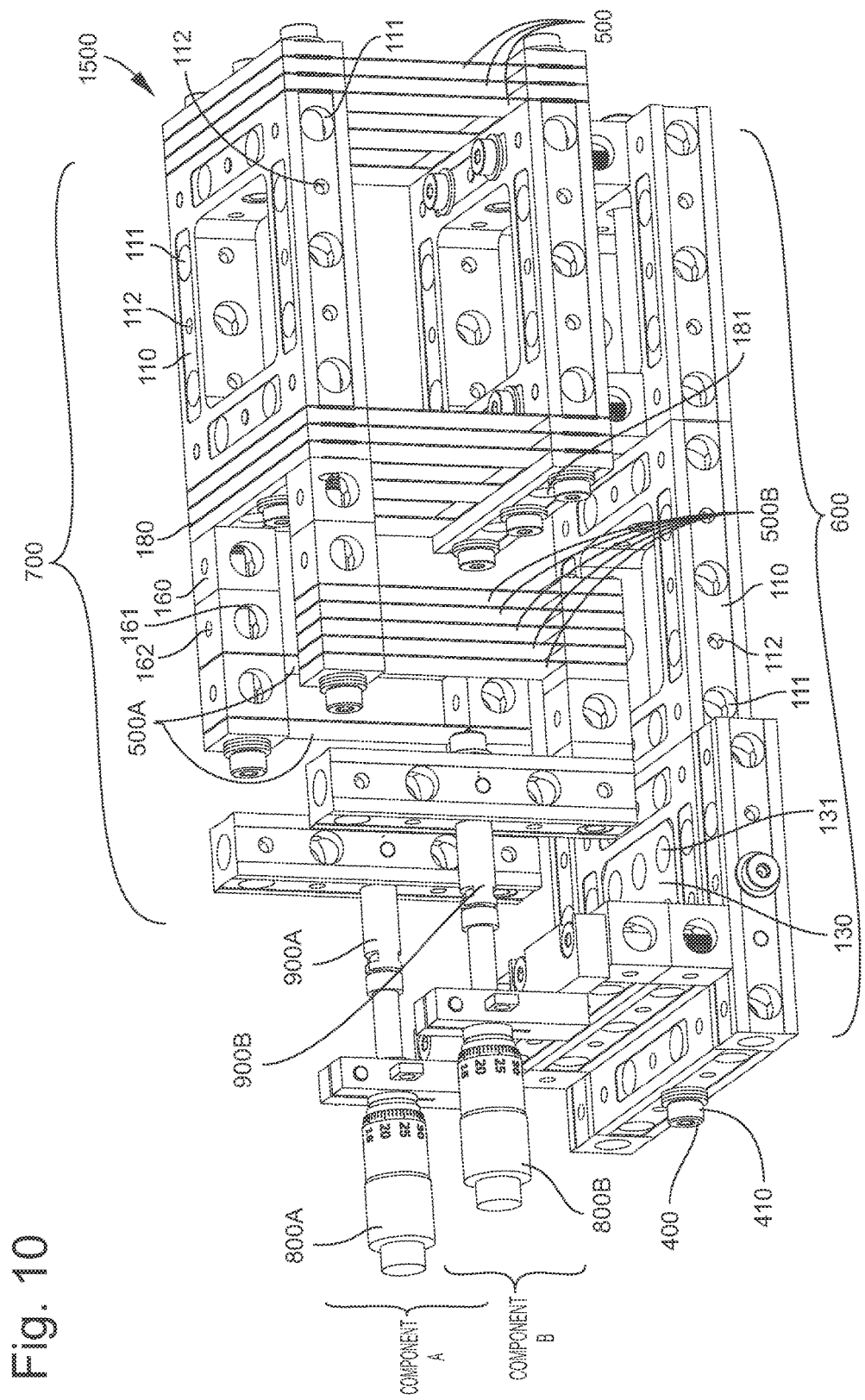
FIG. 10 illustrates a perspective view of an apparatus according to one embodiment described herein.
Figure 11:
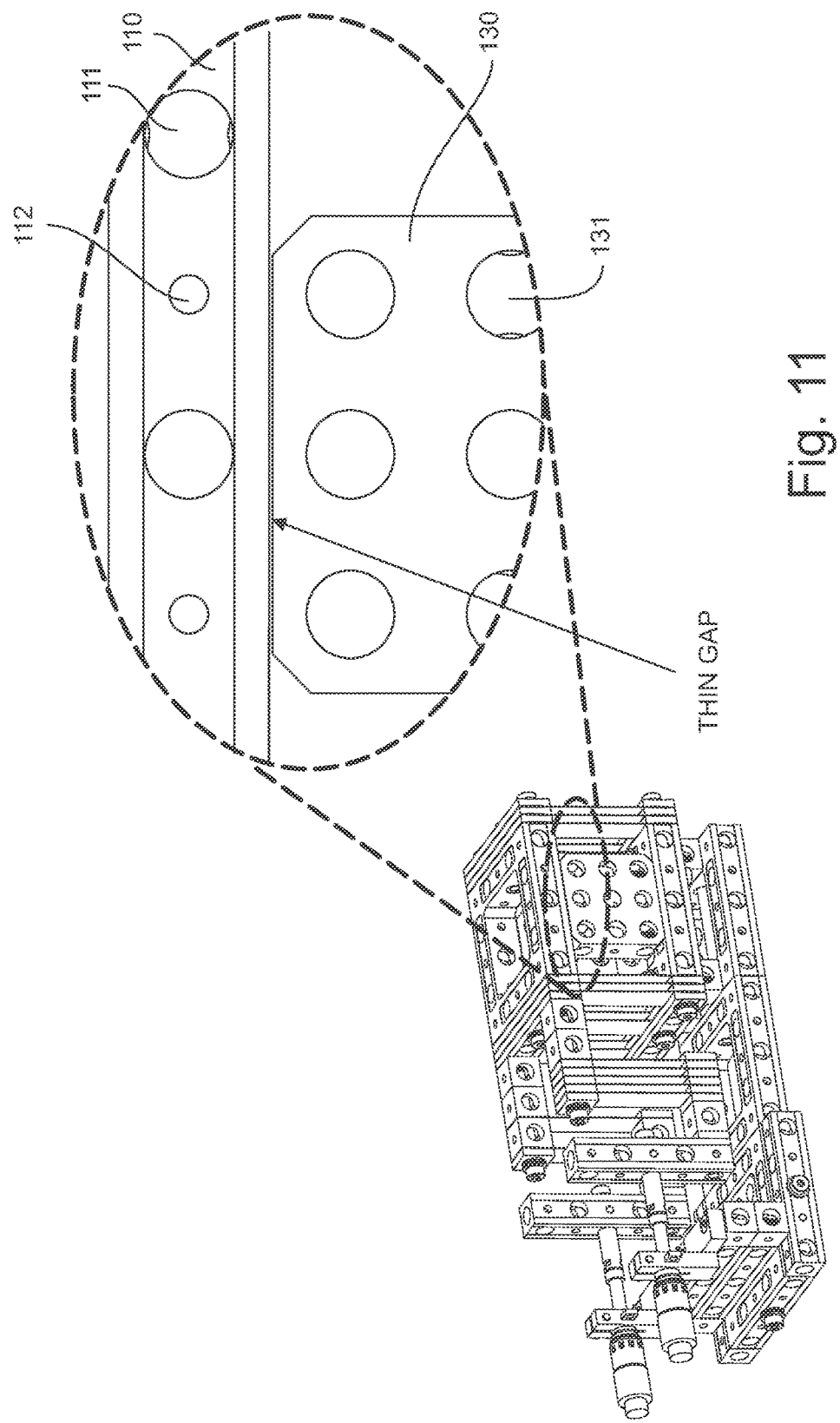
FIG. 11 illustrates an enlarged view of a portion of the apparatus of FIG. 10.

FIG. 10 is a perspective view of an example apparatus according to one embodiment described herein which utilizes one-axis stage translation and two micrometer drives. The apparatus (1500) of FIG. 10 comprises a frame (600) comprised of the elements as described in the foregoing embodiments. The frame (600) is coupled to the stage (700) by flexible elements (500). In the embodiment of FIG. 10, two drive elements (800) are coupled via drive couplings (900) to two separate structures comprising flexible elements (500). In component B comprising flexible elements (500B), a relatively high resistance to flex is present, which enables the drive element (800B) to transfer relatively large amounts of linear translated force, resulting in a coarse translation. Component A comprises a drive element (800A) coupled to a structure having only two flexible elements (500A), which provide a smaller resistance to flex relative to the component B, providing a softer flex portion, enabling finer translation of the stage (700) relative to the stationary frame (600). FIG. 11 is a magnified view of a slightly modified embodiment of the apparatus of FIG. 10. FIG. 11 illustrates a thin gap between modular blocks (110, 130) which can be utilized for squeeze-film and/or shear-type damping with fluid mediums.

Figure 12:
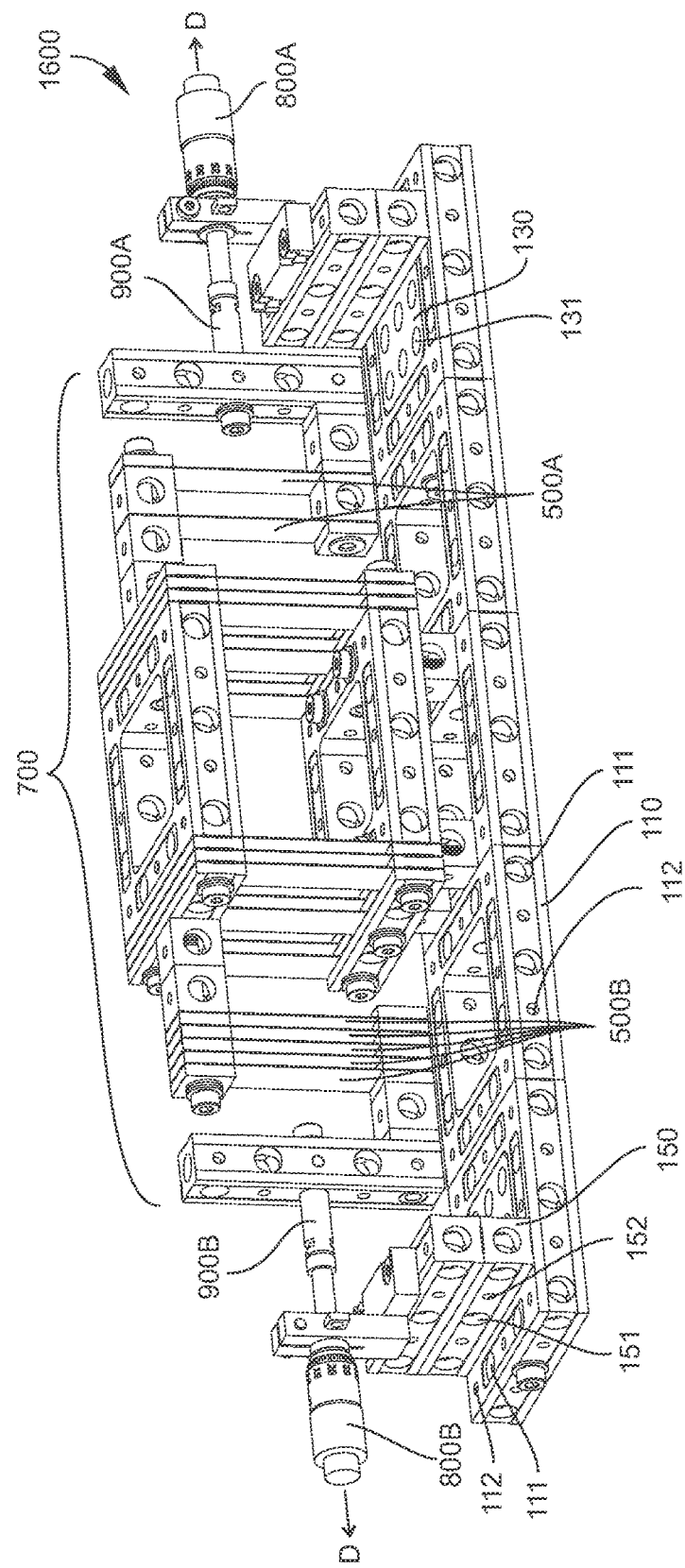
FIG. 12 illustrates a perspective view of an apparatus according to one embodiment described herein.

FIG. 12 is a perspective view of another example apparatus (1600) according to one embodiment described herein which utilizes one-axis stage translation and two micrometer drive elements (800A, 800B). The apparatus (1600) of FIG. 12 is a modified embodiment of FIG. 10, wherein the drive elements (800A, 800B) are opposite one another, providing one-axis translation along axis D by coarse and fine translation via differing configurations of flexible elements (500A, 500B). Whereas the apparatus (1500) of FIG. 10 utilizes a stage on one end of the apparatus (1500), the stage (700) of FIG. 12 is central within the apparatus (1600).

Figure 13:
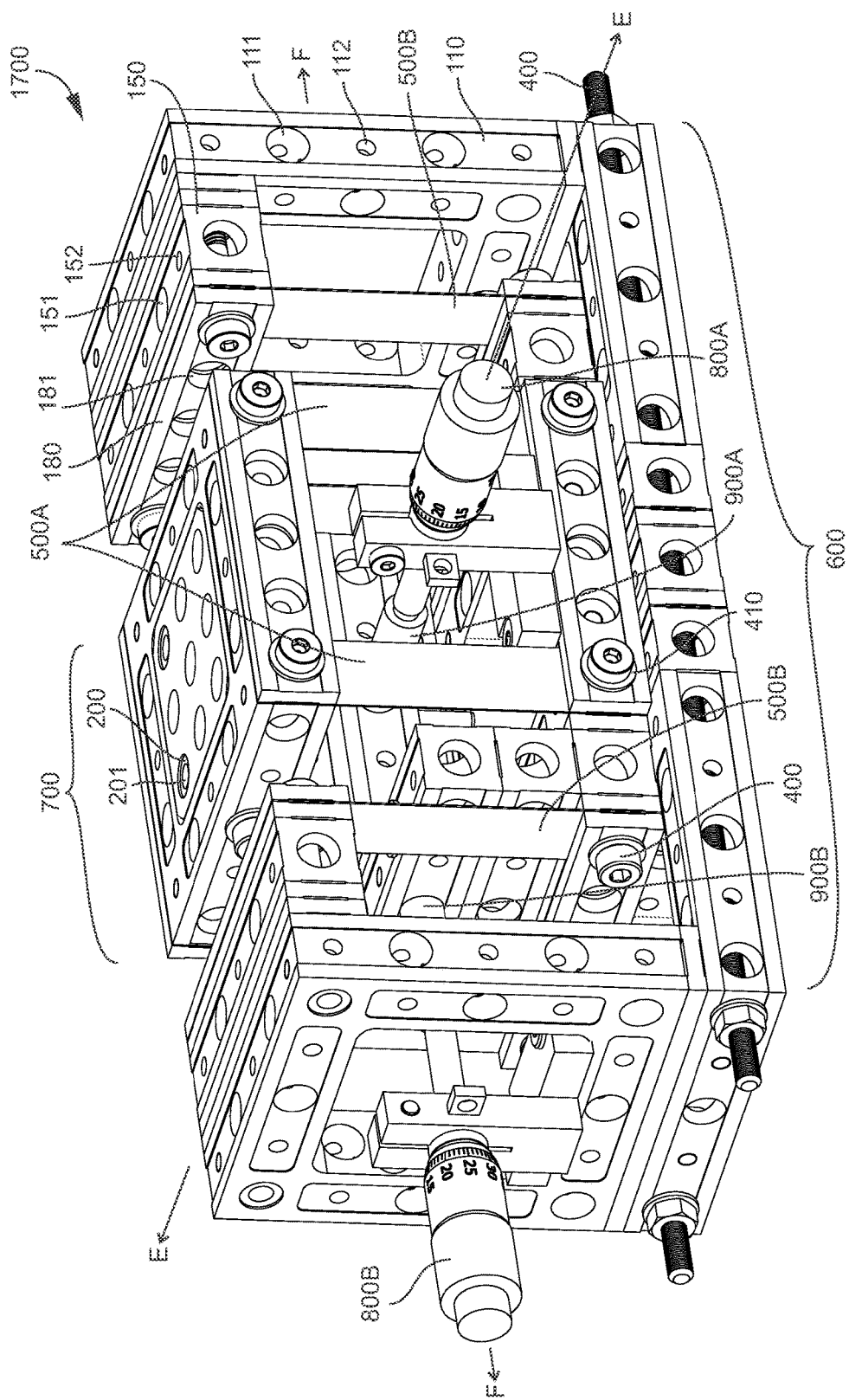
FIG. 13 illustrates a perspective view of an apparatus according to one embodiment described herein.

FIG. 13 is a perspective view of an example apparatus (1700) according to one embodiment described herein which utilizes two-axis stage translation. The apparatus (1700) comprises elements and/or components as described above. The stage (700) is central in the embodiment of FIG. 13, with drive elements (800A, 800B) coupled to the modular blocks (110, 150) on adjacent sides of the frame (600). Flexible elements (500A, 500B) are arranged such that flexible elements (500A) on the sides of the apparatus (1700) permit linear translation along axis E, with flexible elements (500B) on the ends of the apparatus (1700) permitting linear translation along a perpendicular axis F. In the apparatus (1700) of FIG. 13, micrometer drive elements (800A, 800B) are utilized with sphere-to-flat drive couplings (900A, 900B).

Figure 14:
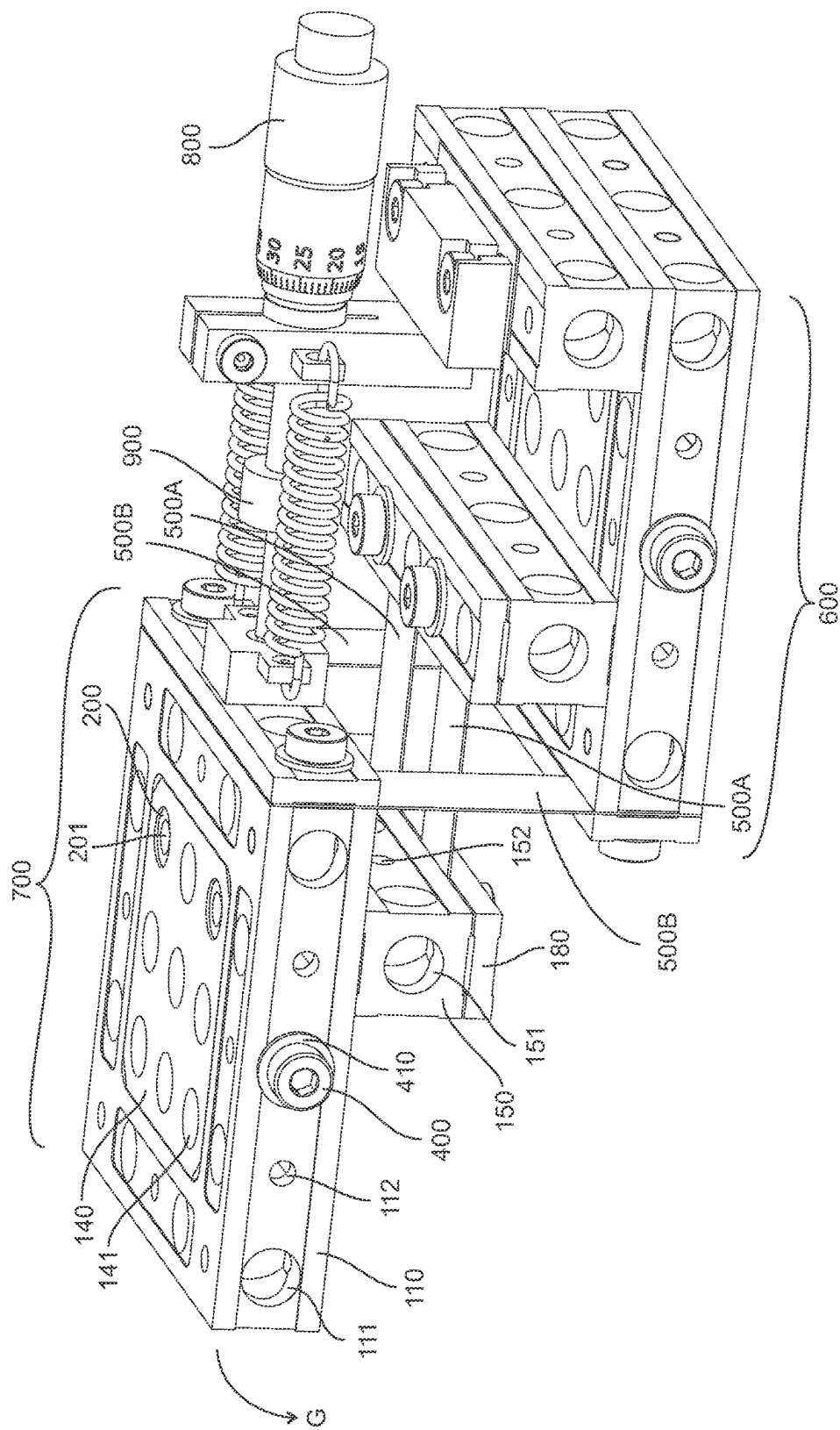
FIG. 14 illustrates a perspective view of an apparatus according to one embodiment described herein.

FIG. 14 is a perspective view of an example apparatus (1800) according to one embodiment described herein which utilizes rotational stage translation and a micrometer drive element (800). In the apparatus (1800) of FIG. 14, the stage (700) is cantilevered over the frame (600), with flexible elements (500A, 500B) being positioned perpendicular relative to one another. In the apparatus (1800) of FIG. 14, some flexible elements (500A) are oriented vertically and other flexible elements (500B) are oriented horizontally. Force transfer through the wobble-pin style drive coupling (900) transfers force to the stage (700) from the drive element (800). Because some flexible elements (500A) are perpendicular to other flexible elements (500B), the net force transfer results in a net rotational translation in direction G.

Figure 15:
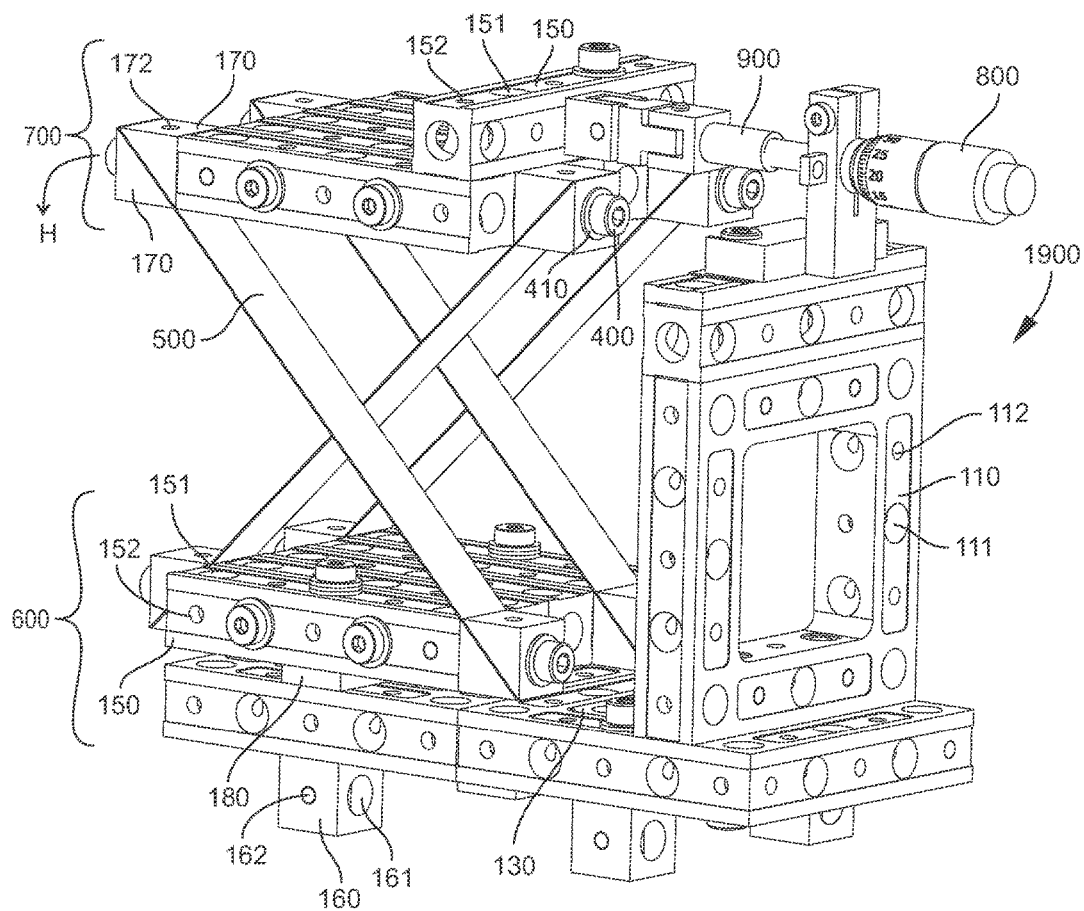
FIG. 15 illustrates a perspective view of an apparatus according to one embodiment described herein.

FIG. 15 is a perspective view of an example apparatus (1900) according to one embodiment described herein which utilizes wedge-shaped modular blocks (170), a micrometer drive element (800), and a universal joint style drive coupling (900). In the apparatus (1900) of FIG. 15, the stage (700) is coupled with the frame (600) by use of wedge-shaped modular blocks (170) in order that the flexible elements (500) can be oriented diagonally relative to the modular blocks (110, 130, 150, 160) which form the bottom portion of the frame (600). When linear force from the micrometer drive element (800) is transferred to the stage (700) through the universal joint style drive coupling (900), the flexible elements (500) deform in a manner which results in a net rotational translation of the stage (700) relative to the frame (600) in direction H.

Figure 16:
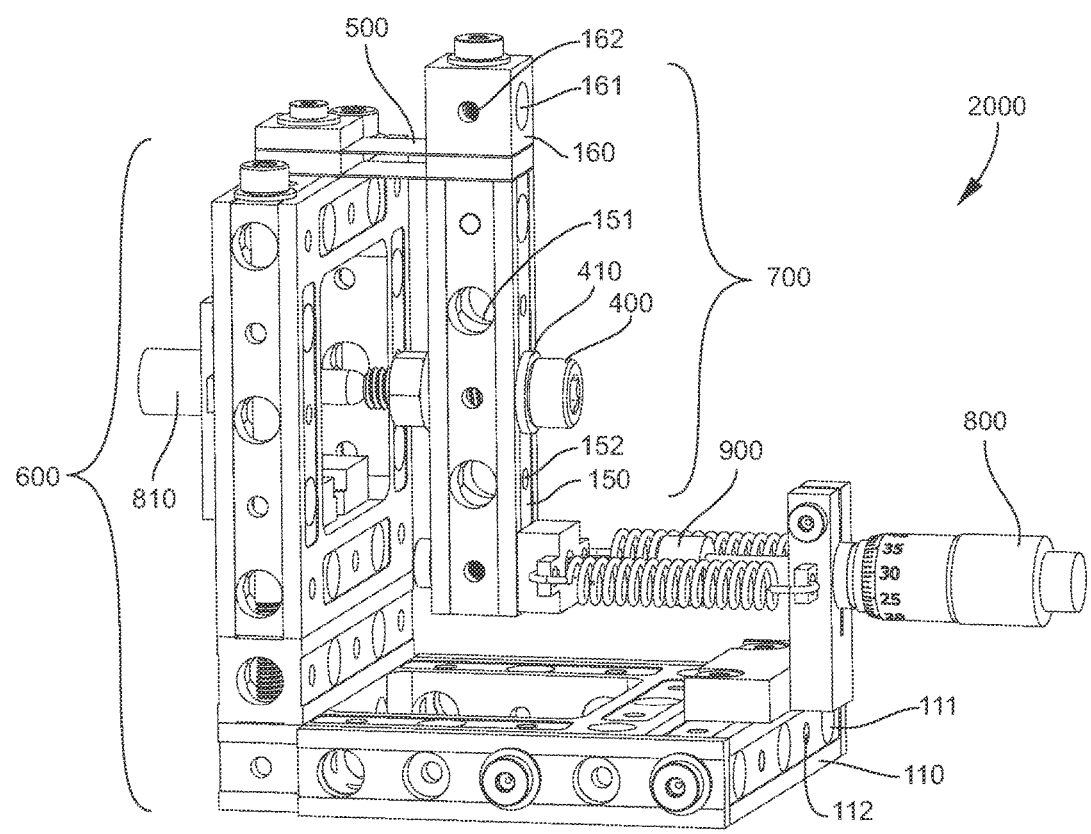
FIG. 16 illustrates a perspective view of an apparatus according to one embodiment described herein.

FIG. 16 is a perspective view of an example apparatus (2000) according to one embodiment described herein which utilizes a micrometer drive element (800), a spring return and wobble-pin drive coupling (900), and a linear transducer (810). In the apparatus (2000) of FIG. 16, the frame (600) forms a right angle structure. The stage (700) is suspended over the frame (700) and is coupled to the frame (600) by flexible elements (500) and the drive element coupling (900). Linkage to the frame (600) by flexible elements (500) only on one end of the stage (700), with force being applied at the second end of the stage (700), results in a net rotational translation of the stage (700) relative to the frame (600) in direction I. In the apparatus (2000) of FIG. 16, a linear transducer (810) is also coupled to the stage (700) by means of a coupling pin (400) in order to measure the motion imparted on the stage (700) by the drive element (800).

Figure 17:
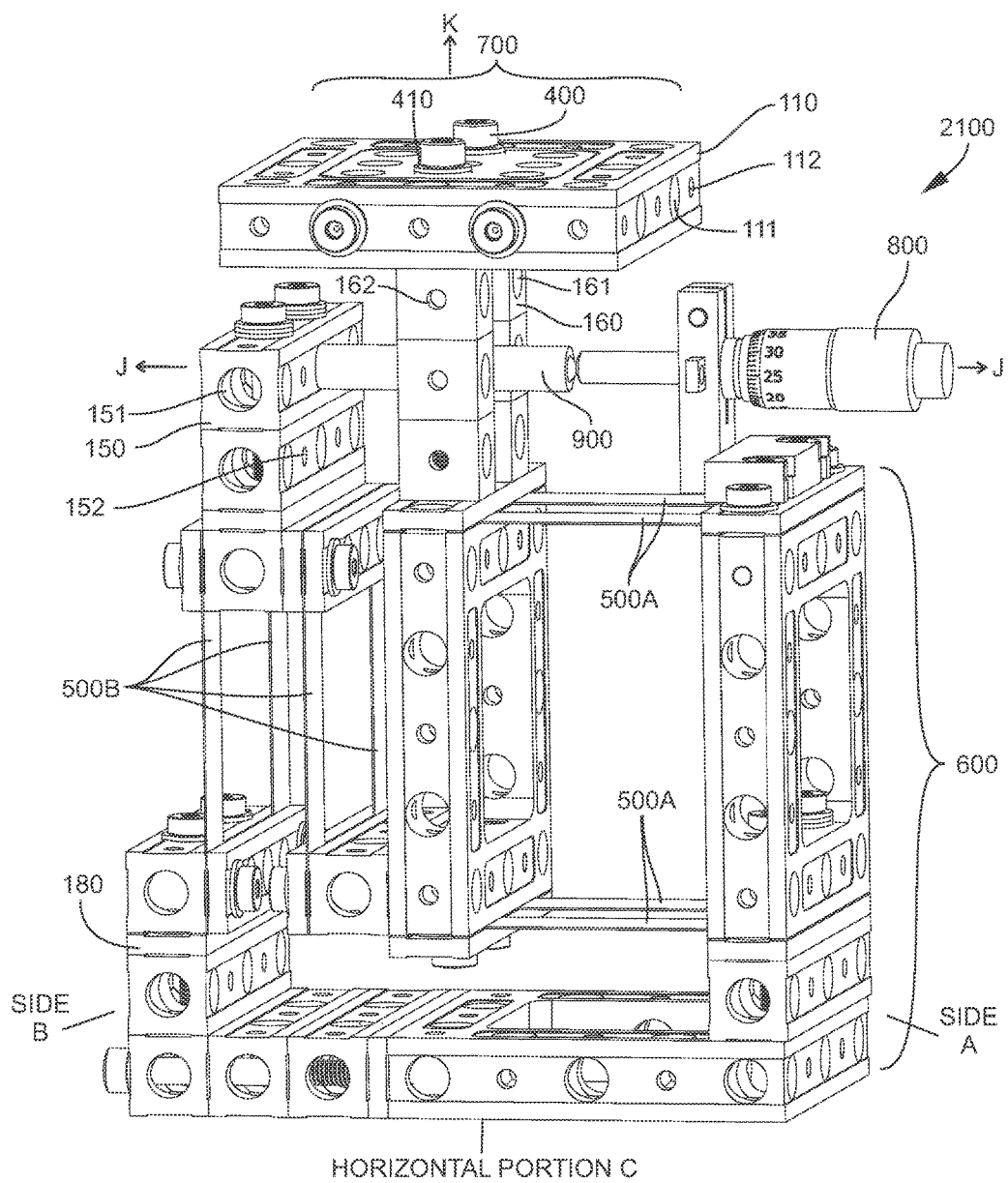
FIG. 17 illustrates a perspective view of an apparatus according to one embodiment described herein.

FIG. 17 is a perspective view of an example apparatus (2100) according to one embodiment described herein which utilizes one-axis fine scale attenuation and a micrometer drive element (800). The apparatus (2100) comprises a frame (600) with a long vertical side A and a short vertical side B, the two being attached by a horizontal portion C. The stage (700) is suspended above the frame (600) by a combination of horizontal and vertical flexible elements (500A, 500B). The micrometer style drive element (900) applies a horizontal linear force to the modular blocks (150) along axis J, the force being transferred through a sphere-to-flat drive coupling (900). In such a configuration, horizontally applied force results in deformation of the vertically oriented flexible elements (500B), which are flexed, resulting in a flex of the horizontally oriented flexible elements (500A) which subsequently moves platform (700) in a vertical direction. The net motion of the stage (700) is indicated by arrow K.

Figure 18:
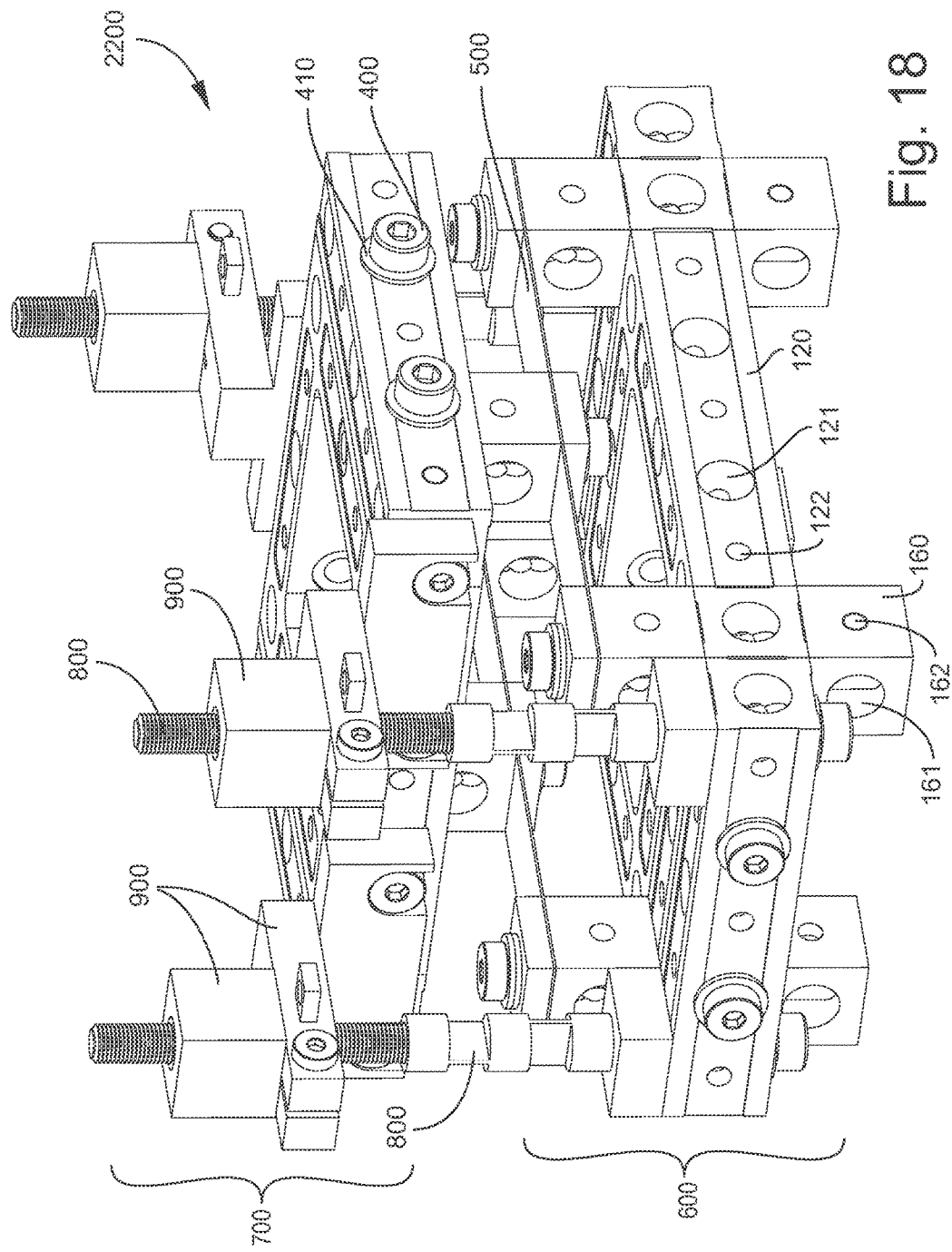
FIG. 18 illustrates a perspective view of an apparatus according to one embodiment described herein.

FIG. 18 is a perspective view of an example apparatus (2200) according to one embodiment described herein which utilizes dual rotation axes, a linear axis stage (700), and screw type translation drive elements (800). In the apparatus (2200) of FIG. 18, a horizontally oriented frame (600) is disposed below a horizontally oriented stage (700) which is coupled to the frame (600) by flexible elements (500). In the embodiment of FIG. 18, the drive elements (800) comprise screw type translation drive elements (800). In such an embodiment, the screw type translation drive elements may be tightened or loosened in a variety of different manners in order to provide linear translation (when all are used with equivalent force/turns), tip/tilt rotational translation (when one or more drive elements (800) are applied with unequal force/turns), and/or multi-axis rotational translation when varying amounts of force are applied through the drive elements (800). The screw type drive elements are coupled to the stage (700) by drive couplings (900).

Figure 19:
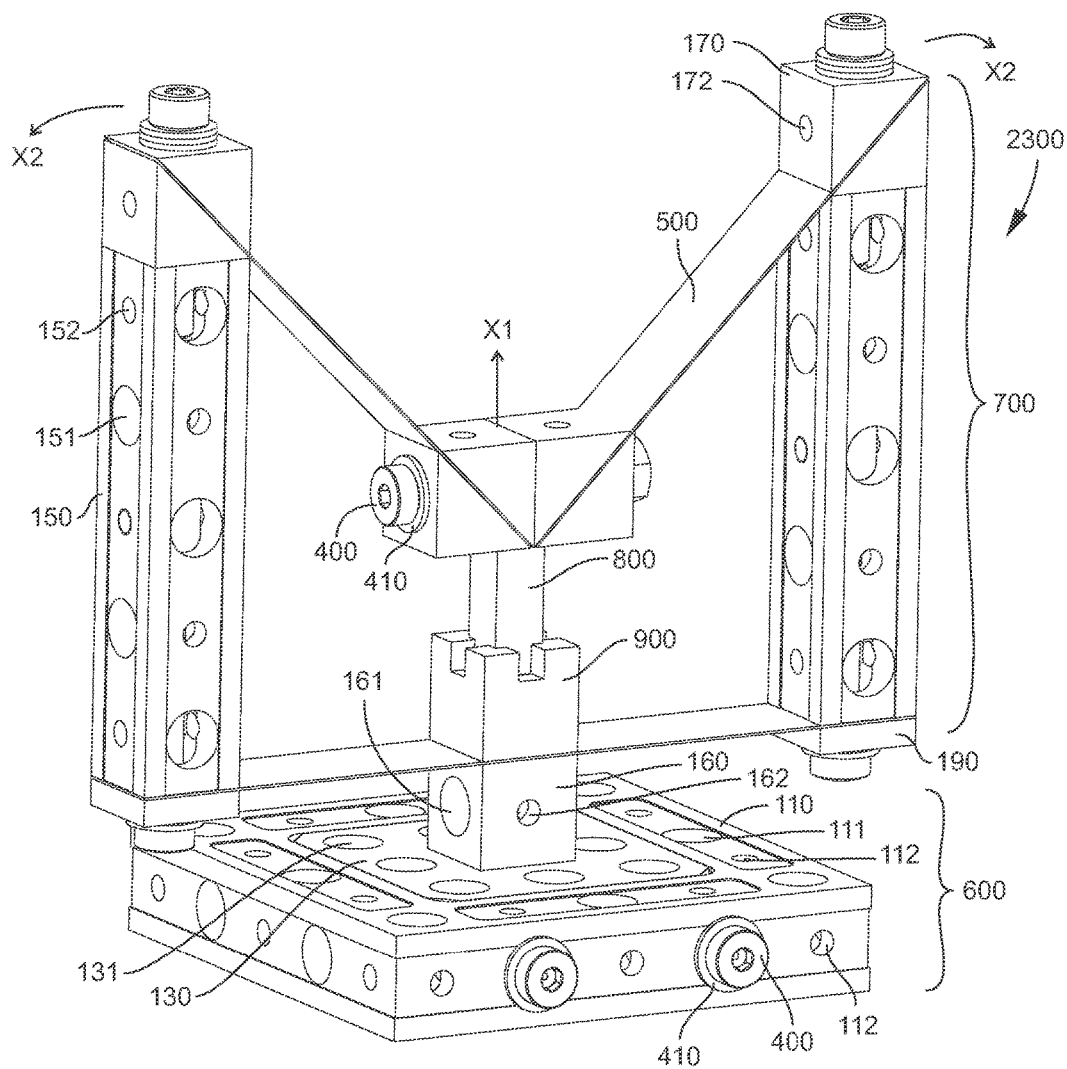
FIG. 19 illustrates a perspective view of an apparatus according to one embodiment described herein.

FIG. 19 is a perspective view of an example apparatus according to one embodiment described herein which utilizes a dual arcuate motion stage (700) and a piezoelectric actuator drive element (800). The frame (600) is formed as a horizontal support structure beneath the stage (700). The stage comprises horizontally and diagonally oriented flexible elements (500). Force applied in the lowermost central portion of the stage through the actuator (900) provides linear force which is transformed through the angled flexible elements (500) into dual arcuate motion of the outer modular blocks (150) on the outer portions of the stage (700). Motion of actuator (800), shown as axis X1, results in motion of the outer modular blocks (15) in direction X2. The flexible elements (500) are coupled with wedge-shaped modular blocks (170).

Figure 20:
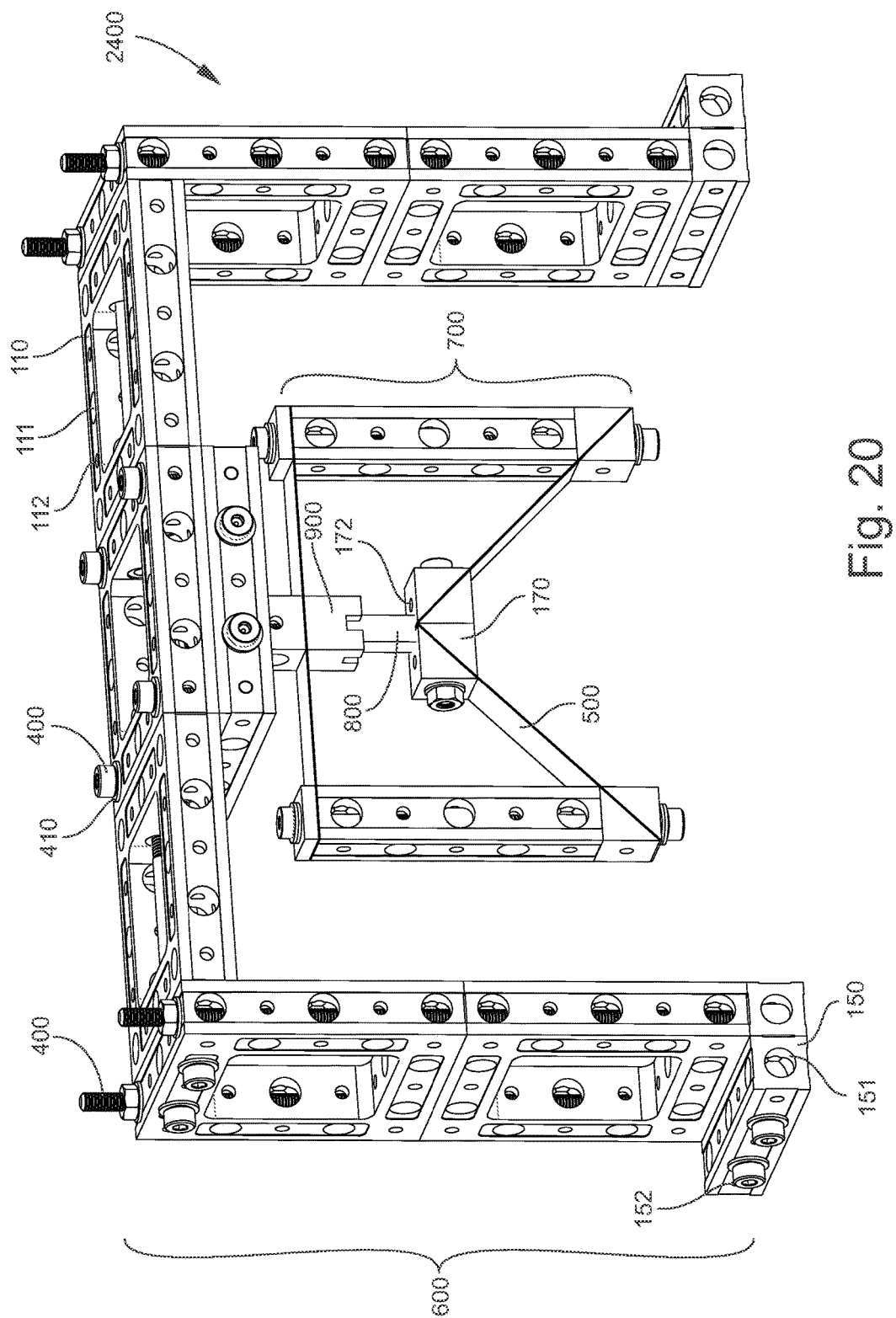
FIG. 20 illustrates a perspective view of an apparatus according to one embodiment described herein.

FIG. 20 is a perspective view of an example apparatus (2400) according to one embodiment described herein which utilizes a bridge frame (600) form factor combined with the apparatus (2300) of FIG. 19. The frame (600) of the apparatus (2300) of FIG. 19 is integrated with the frame (600) of the apparatus (2400) of FIG. 20. In such an arrangement, the stage (700) can be combined with a larger apparatus (2400) for varied applications.

Figure 21:
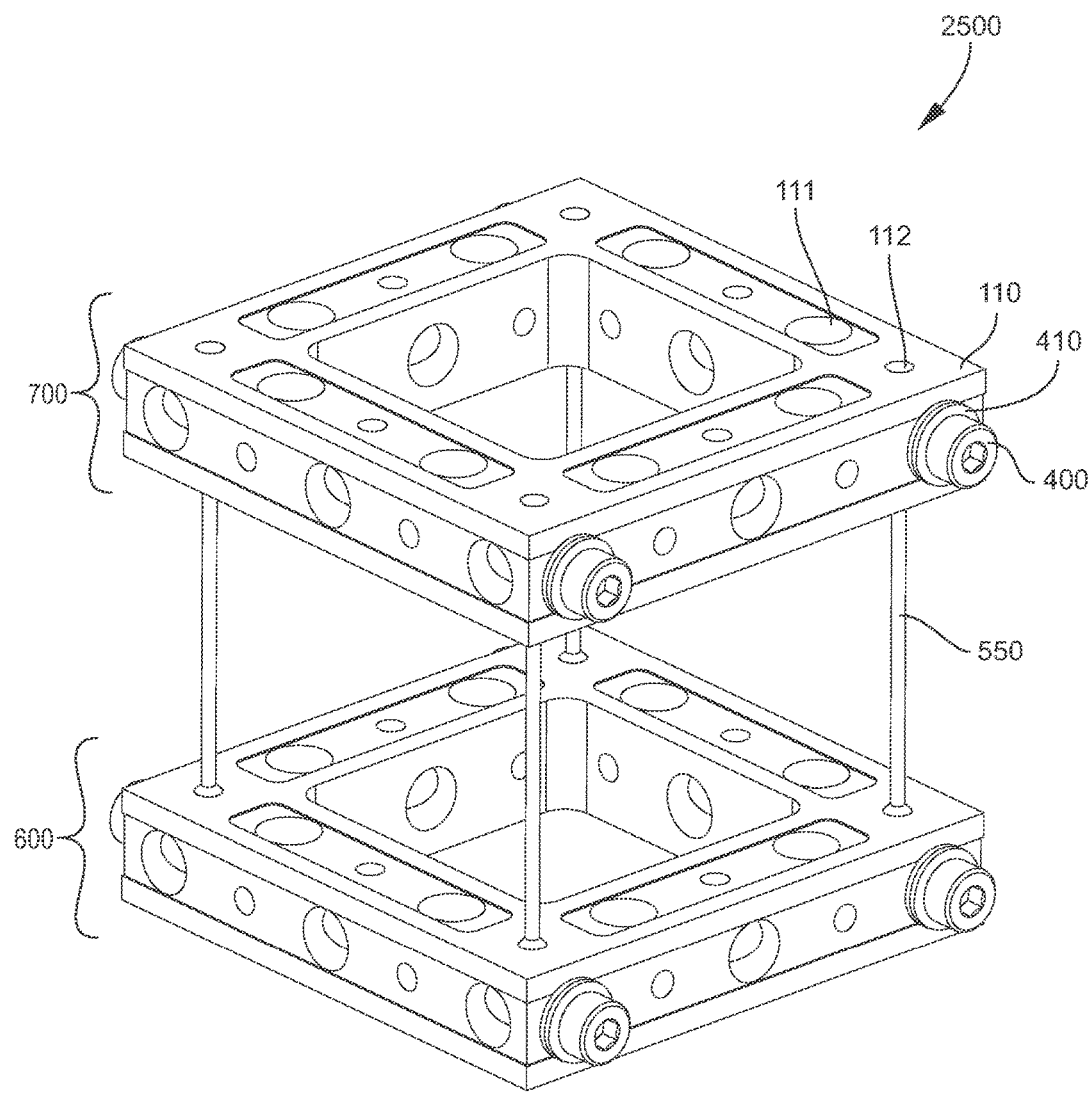
FIG. 21 illustrates a perspective view of an apparatus according to one embodiment described herein.
Figure 22:
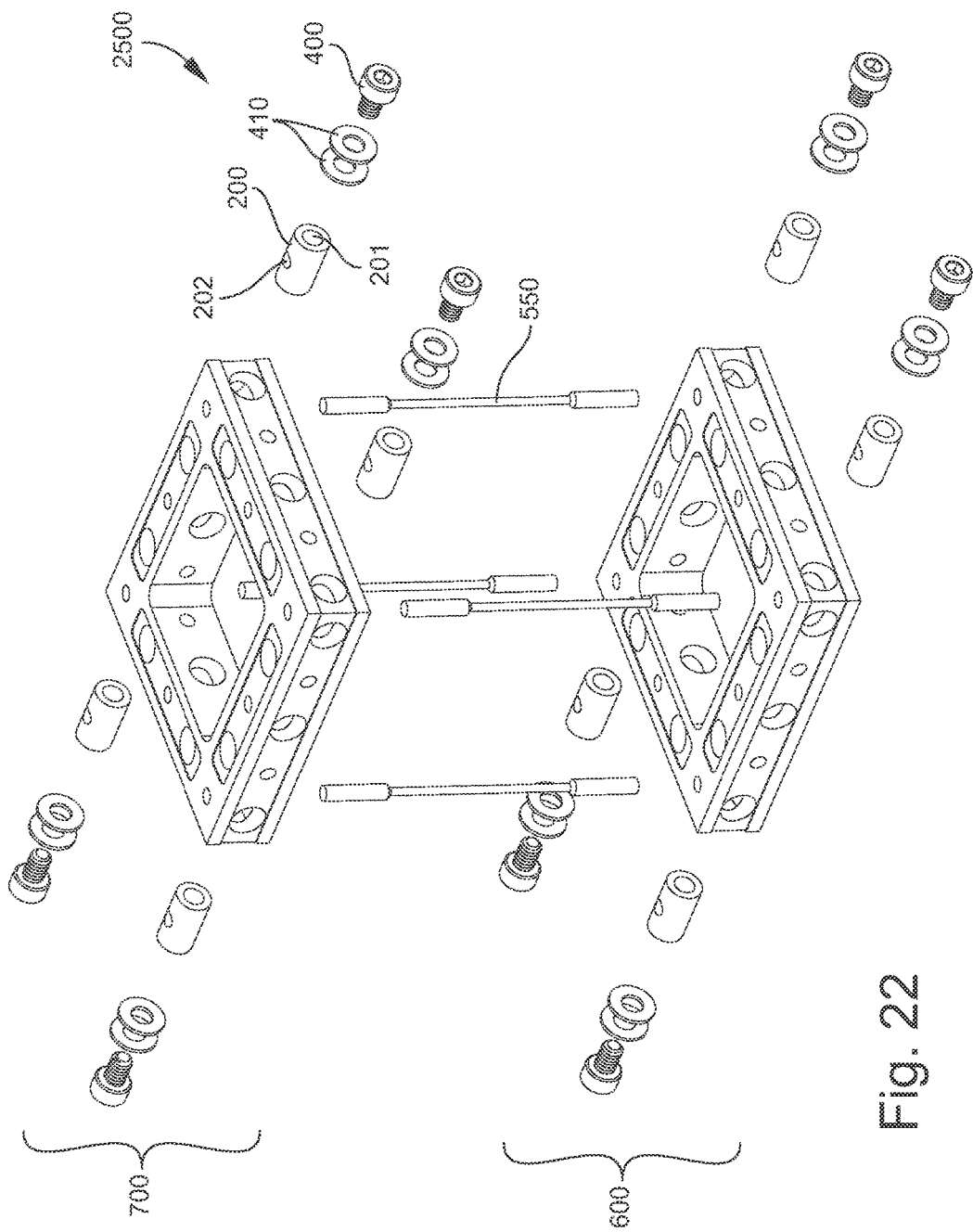
FIG. 22 illustrates an exploded view of the apparatus of FIG. 21.

FIG. 21 is a perspective view of an example apparatus (2500) according to one embodiment described herein which utilizes rotational metal rod flexible elements (550). FIG. 22 is an exploded view of the apparatus (2500) of FIG. 21. The frame (600) is formed from a single modular block (110) with metal rod flexible elements (550) inserted into the second apertures (112) of the modular blocks (110) and sidewall apertures (202) of the fastening sleeves (200) and secured by coupling pins (400). The metal rod flexible elements link the frame (600) to the stage (700) above the frame (600). The rotationally symmetric metal rod flexible elements (550) permit omnidirectional translation and rotation of the stage (700) relative to the frame (600).

Figure 23:
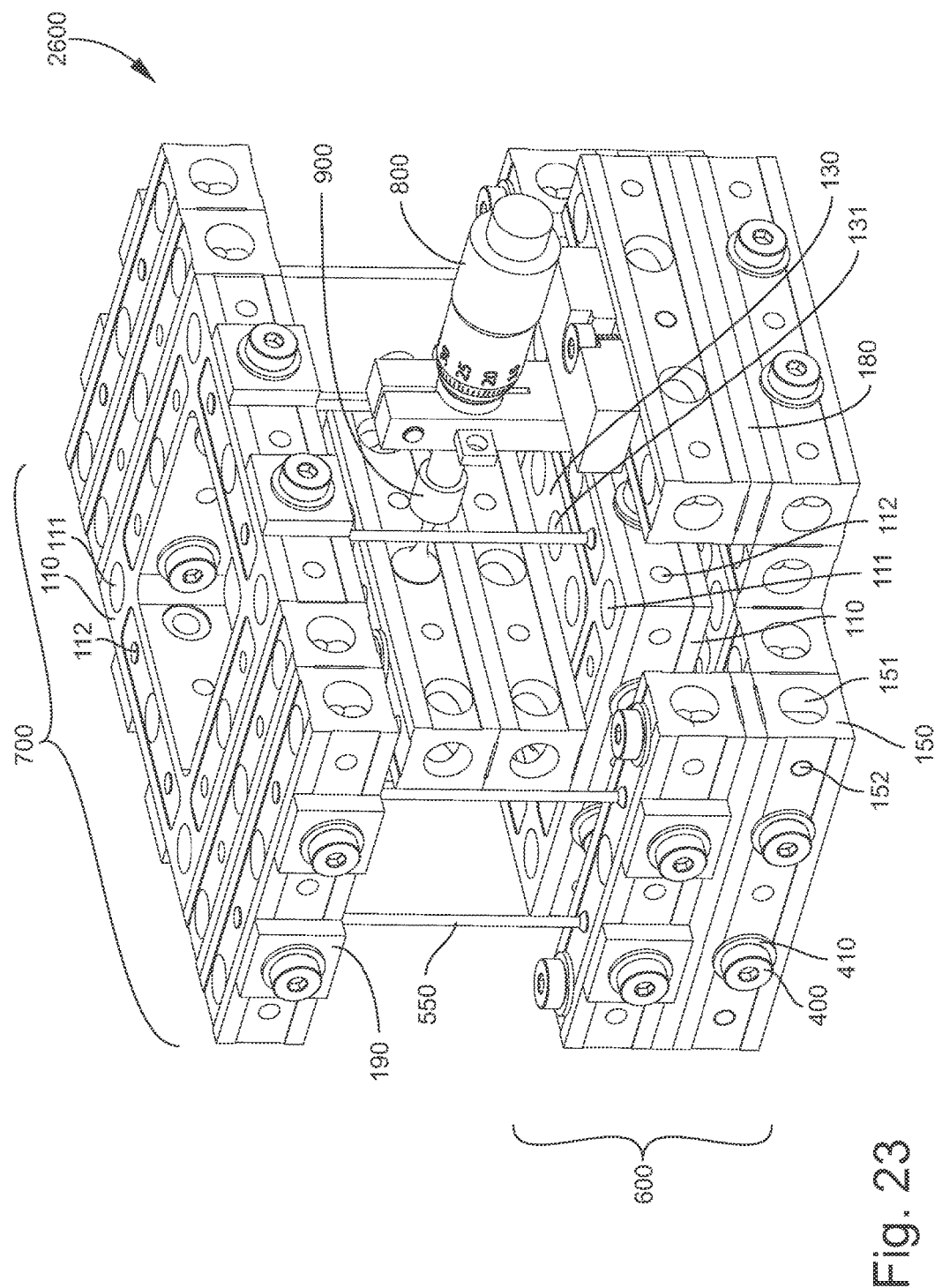
FIG. 23 illustrates a perspective view of an apparatus according to one embodiment described herein.

FIG. 23 is a perspective view of an example apparatus (2600) according to one embodiment described herein which utilizes metal rod rotational flexible elements (550) with a micrometer drive element (800). The stage (700) of the apparatus (2600) is suspended above the frame (600) and linked to the frame (600) by the use of metal rod flexible elements (550). A single micrometer drive element (800) is shown which is linked to the stage (700) by a symmetric notch style drive coupling (900) in order to provide one-axis translation of the stage (700) relative to the frame. Although not shown, additional drive elements could be linked to the stage (700) to add additional axes of translation and/or rotation for additional applications. Multi-axis translation and/or rotation of the stage (700) is enabled by the rotationally symmetric metal rod flexible elements (550).

Figure 24:
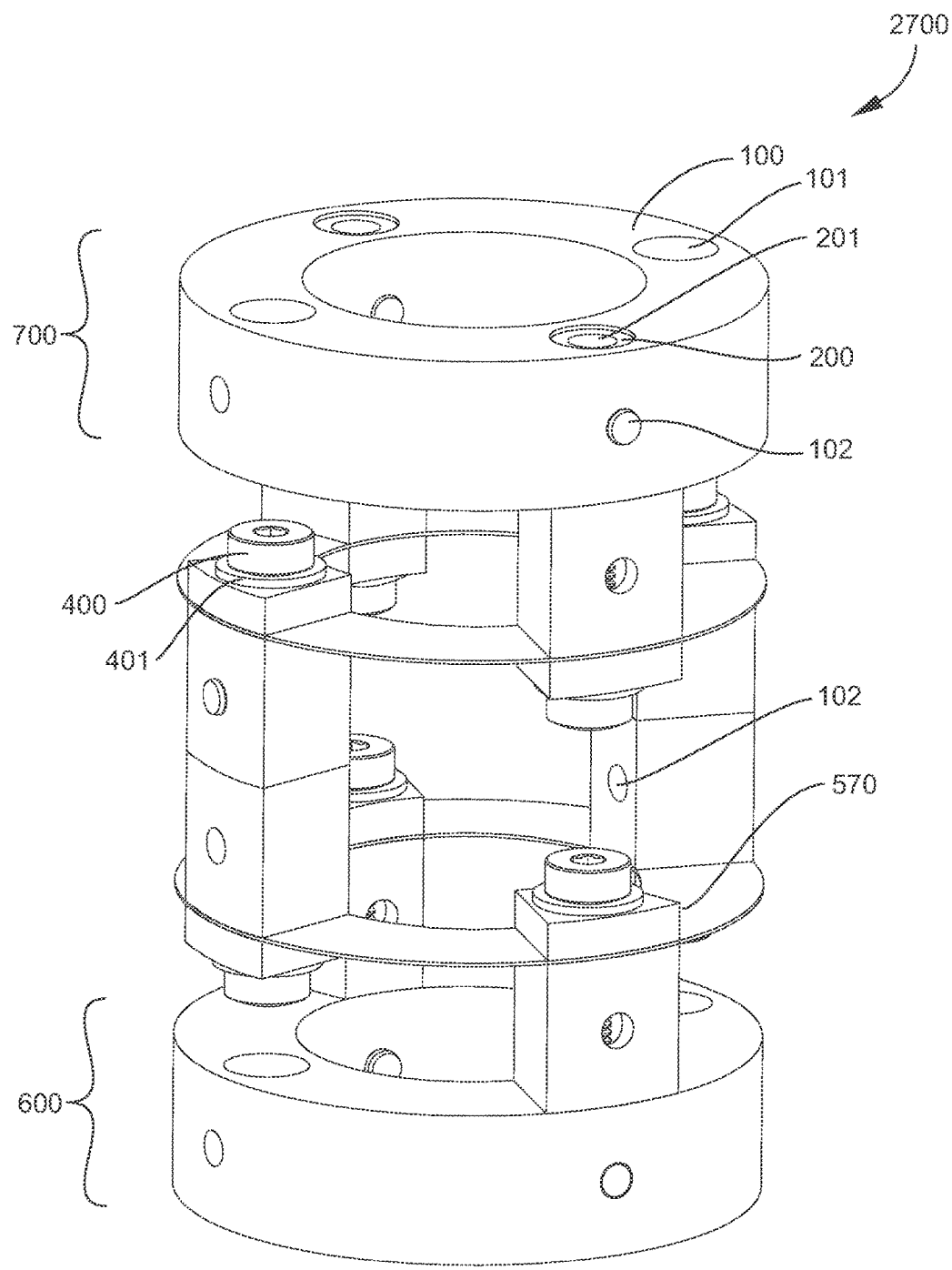
FIG. 24 illustrates a perspective view of an apparatus according to one embodiment described herein.
Figure 25:
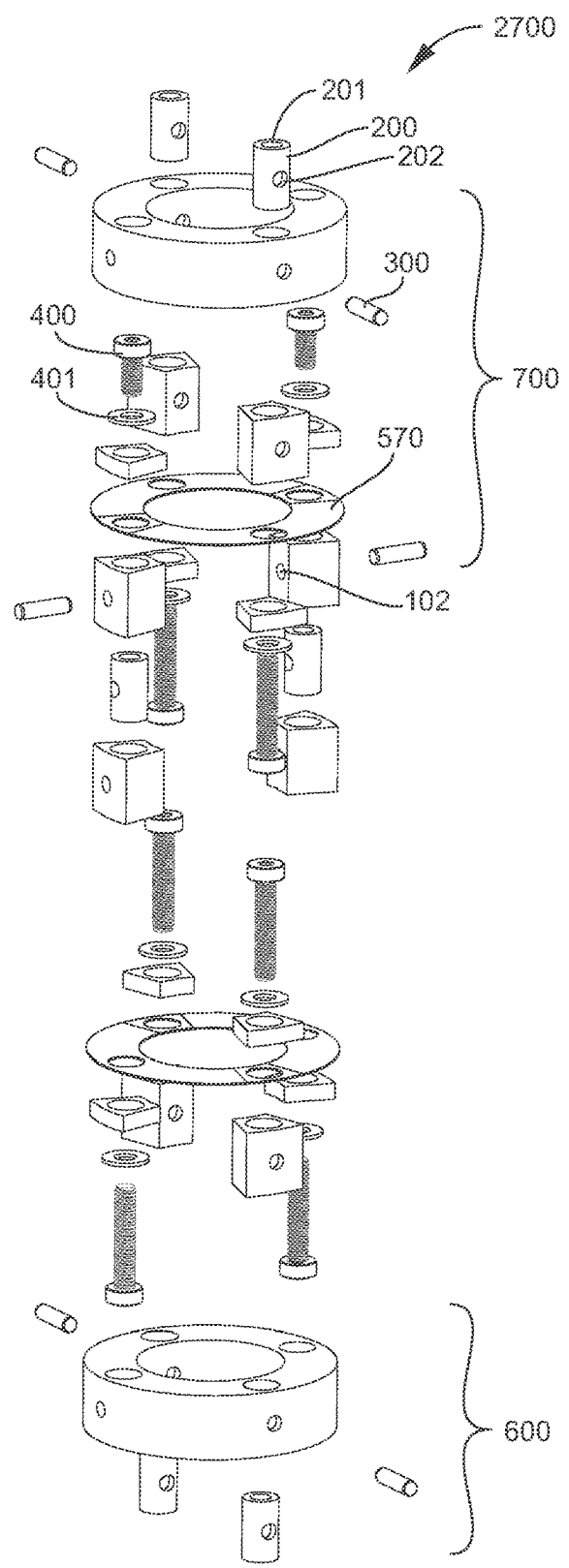
FIG. 25 illustrates an exploded view of the apparatus of FIG. 24.
Figure 26:
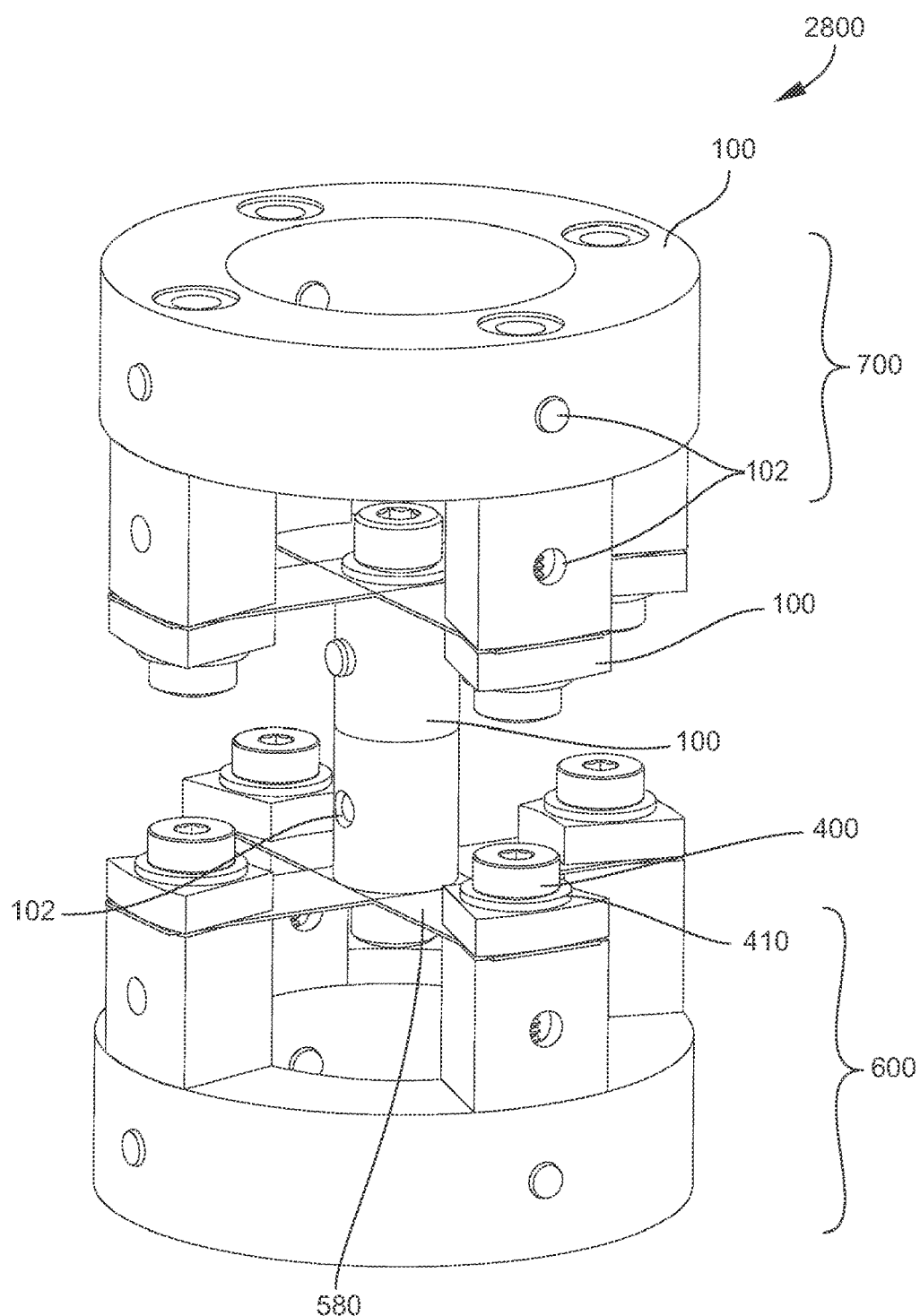
FIG. 26 illustrates a perspective view of an apparatus according to one embodiment described herein.

FIG. 24 is a perspective view of an example apparatus (2700) according to one embodiment described herein which utilizes cylindrical style modular blocks (100) and circular flexible elements (500). FIG. 25 is an exploded view of the apparatus of FIG. 24. The frame (600) lies directly beneath the stage (700). In the embodiment of FIGS. 24 and 26, the apparatus (2700) is assembled using modular blocks (100) which have circular or arcuate cross-sections.

Figure 27:
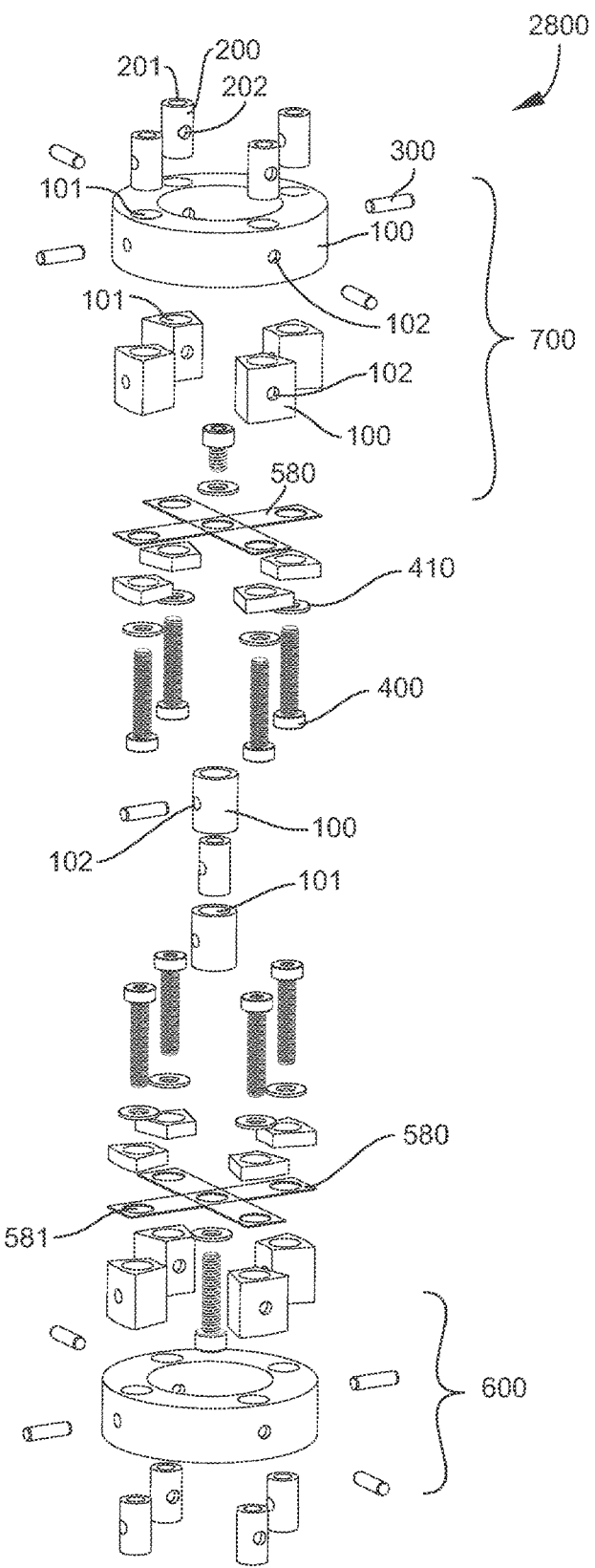
FIG. 27 illustrates an exploded view of the apparatus of FIG. 26.

FIG. 26 is a perspective view of another example apparatus (2800) according to one embodiment described herein which utilizes cylindrical style modular blocks (100). FIG. 27 is an exploded view of the apparatus (2800) of FIG. 25. Similar to the apparatus (2700) of FIGS. 24 and 25, the apparatus (2800) of FIGS. 26 and 27 includes modular blocks (100) having circular or arcuate cross-sections. In contrast to the apparatus (2700) of FIGS. 24 and 25, the apparatus (2800) of FIGS. 26 and 27 features an X-shaped metal sheet flexible element (580). In some embodiments, the flexible element (580) could comprise two or more simple sheet flexible elements which intersect, having an aperture disposed therebetween.

III. Methods of Constructing an Apparatus

In another aspect, methods of constructing an apparatus are also described herein. In some embodiments, a method comprises constructing an apparatus comprising a stage, wherein constructing comprises providing a kit including a plurality of modular blocks, fastening sleeves, sleeve pins and coupling pins. Modular blocks comprise a series of first apertures for receiving one or more fastening sleeves and a series of second apertures for receiving the sleeve pins, wherein the second apertures intersect the first apertures. The kit can be any kit described hereinabove in section I, and the apparatus can be any apparatus described herein above in section II.

In some embodiments, constructing a stage further comprises inserting the fastening sleeves in the first apertures and inserting the sleeve pins in the second apertures to secure the fastening sleeves into the first apertures. In further embodiments, constructing an apparatus described herein further comprises connecting the modular blocks to one another to form a frame of the apparatus by engaging the fastening sleeves with the coupling pins. The frame may have any properties, configurations and/or orientations consistent with the foregoing disclosure and not inconsistent with the objectives of the present invention.

Constructing an apparatus can, in some embodiments, further comprise connecting the stage to the frame through one or more flexible elements. Connecting the stage to the frame through one or more flexible elements may be achieved in any manner described hereinabove in sections I and II.

In some embodiments, methods of constructing an apparatus described herein can further comprise connecting at least one drive element to the frame, the drive element operable to move one or more of the modular blocks resulting in deformation of the flexible elements to translate the stage. Consistent with the foregoing, a drive element can take a variety of forms. Some non-limiting examples can comprise, consist, or consist essentially of one or more of micrometer drives, friction drives, electromagnets, magnetostrictive actuators, magnetoelastic actuators, piezoelectric actuators, hydraulic actuators, pneumatic actuators, electrostrictive actuators, electrostatic actuators, shape memory actuators, thermal actuators, and/or actuators using Poisson's ratio. In such embodiments, the stage may be translated and/or translatable in at least one or more of linear and/or rotational manners. A drive element can be connected to the frame and/or the stage in any manner not inconsistent with the objectives of the present invention and as described hereinabove in sections I and II. For example, a drive element can be coupled with the frame and/or stage by one or more of wobble-pin, universal or u-joint, sphere-to-flat, mechanical insert, and/or rotationally symmetric notch drive coupling devices and/or structures. In some embodiments, methods of constructing an apparatus described herein can comprise connecting at least two drive elements along a single axis, parallel to one another for coarse and/or fine translation, perpendicular to one another for multi-axes translation, and/or other configurations consistent with the objectives of the present invention.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A kit for constructing an apparatus comprising:
   a plurality of modular blocks;
   fastening sleeves, sleeve pins and coupling pins for connecting the modular blocks to one another, a modular block comprising a series of first apertures for receiving one or more of the fastening sleeves and a series of second apertures for receiving the sleeve pins to secure the fastening sleeves in the first apertures, wherein the second apertures intersect the first apertures; and
   flexible elements for connecting the modular blocks to one another, the flexible elements permitting movement of the modular blocks relative to one another.

2. The kit of claim 1, wherein adjacent faces of the modular block each comprise the series of first apertures and the series of second apertures.

3. The kit of claim 2, wherein the first apertures alternate with the second apertures along each adjacent face.

4. The kit of claim 1, wherein intersecting first apertures and second apertures are normal to one another.

5. The kit of claim 1, wherein interiors of the fastening sleeves are of dimensions to engage the coupling pins.

6. The kit of claim 1, wherein fastening sleeve interiors are threaded.

7. The kit of claim 1, wherein the fastening sleeves comprise a sidewall aperture for receiving the sleeve pins.

8. The kit of claim 1, wherein the flexible elements are selected from the group consisting of metal sheets, metal rods, metal bars, and complex shapes.

9. The kit of claim 1, wherein the flexible elements comprise one or more apertures for receiving the coupling pins.

10. The kit of claim 1, wherein the modular blocks are formed of metal.

11. The kit of claim 1, wherein the apparatus constructed from the kit comprises a stage translatable by deformation of the flexible elements.

12. The kit of claim 11, wherein the flexible elements are deformed by one or more drive elements linked to one or more modular blocks.

13. The kit of claim 12, wherein the one or more drive elements are linked to one or more modular blocks by a drive coupling.

14. The kit of claim 11, wherein the stage is at least one of linearly translatable and rotationally translatable.

15. An apparatus comprising:
   a frame including a plurality of modular blocks connected by fastening sleeves and coupling pins, the fastening sleeves positioned in a series of first apertures in the modular blocks and secured in the first apertures by sleeve pins, the sleeve pins positioned in a series of second apertures in the modular blocks, wherein the second apertures intersect the first apertures;

a stage coupled to the frame by one or more flexible elements; and a drive element coupled to one or more of the modular blocks, the drive element operable to move the one or more modular blocks resulting in deformation of the one or more flexible elements to translate the stage.

16. The apparatus of claim 15, wherein the stage is at least one of linearly translated and rotationally translated.

17. The apparatus of claim 15, wherein adjacent faces of a modular block each comprise the series of first apertures and the series of second apertures.

18. The apparatus of claim 17, wherein the first apertures alternate with the second apertures along each adjacent face.

19. The apparatus of claim 15, wherein intersecting first apertures and second apertures are normal to one another.

* * * * *